United States Patent
Yano et al.

[11] Patent Number: 5,875,864
[45] Date of Patent: Mar. 2, 1999

[54] CONTROL SYSTEM FOR HYBRID VEHICLES

[75] Inventors: Toru Yano; Takahiro Yonekura; Hidehito Ikebe; Yusuke Tatara; Yutaka Tamagawa, all of Wako, Japan

[73] Assignee: Honda Giken Kogyo Kabushiki Kaisha, Tokyo, Japan

[21] Appl. No.: 821,867

[22] Filed: Mar. 21, 1997

[30] Foreign Application Priority Data

Apr. 10, 1996 [JP] Japan .................................. 8-112190

[51] Int. Cl.$^6$ ...................................................... B60K 6/04
[52] U.S. Cl. .......................... 180/65.4; 701/22; 307/10.1; 123/198 DB
[58] Field of Search .................. 180/65.1, 65.2, 180/65.3, 65.4; 340/441, 466; 307/10.1; 123/198 DB; 701/22

[56] References Cited

U.S. PATENT DOCUMENTS

| | | | |
|---|---|---|---|
| 5,358,317 | 10/1994 | Cikanek | 701/77 X |
| 5,450,324 | 9/1995 | Cikanek | 701/108 X |
| 5,608,308 | 3/1997 | Kiuchi et al. | 180/65.2 X |
| 5,725,064 | 3/1998 | Ibaraki et al. | 180/65.2 |
| 5,778,326 | 7/1998 | Moroto et al. | 701/22 |

FOREIGN PATENT DOCUMENTS 5-229351 9/1993 Japan.

*Primary Examiner*—Brian L. Johnson
*Assistant Examiner*—William R. Zimmerli
*Attorney, Agent, or Firm*—Frishauf, Holtz, Goodman, Langer & Chick

[57] ABSTRACT

A control system is provided for a hybrid vehicle including an internal combustion engine, a drive shaft driven by the engine, a generator for converting kinetic energy of the drive shaft to electrical energy to generate electric power, and an electrical storage device for storing electrical energy output from the generator. Deceleration of the engine is detected. Supply of fuel to the engine is interrupted during the deceleration of the engine. An amount of intake air supplied to the engine is controlled such that the amount of intake air supplied to the engine is increased when the generator regenerates electrical energy during the deceleration of the engine. Calculation is made of an amount of electrical energy to be regenerated by the generator during the deceleration of the engine. An output from the generator is controlled based on the amount of electrical energy calculated.

10 Claims, 23 Drawing Sheets

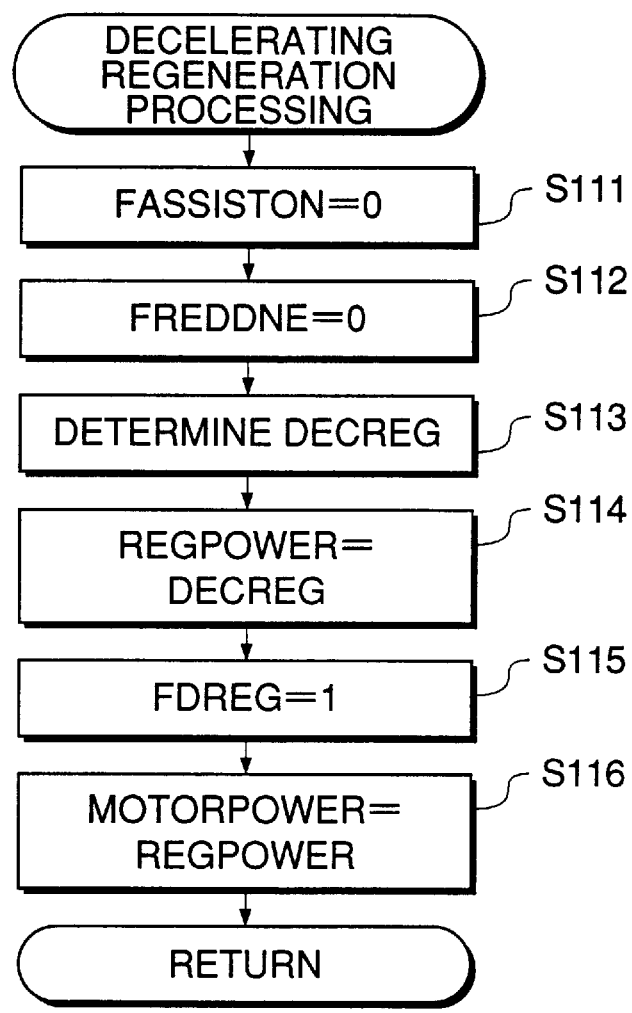

CONTROL SYSTEM FOR HYBRID VEHICLES

BACKGROUND OF THE INVENTION

1. Field of the Invention

This invention relates to a control system for hybrid vehicles having an internal combustion engine and a traction motor as prime movers.

2. Prior Art

Conventionally, a hybrid vehicle having an internal combustion engine (hereinafter simply referred to as "the engine") and a traction motor as prime movers is widely known, and a control system for controlling the prime movers of such a hybrid vehicle has already been proposed e.g. by Japanese Patent Laid-Open Patent Publication (Kokai) No. 5-229351.

The proposed control system determines the optimum torque at which the maximum engine efficiency is attained, in dependence on traveling conditions of the vehicle, and at the same time detects actual torque generated by the engine for actually driving the vehicle. Then, the control system determines or selects demanded or required torque from the optimum torque and the actual torque. When the optimum torque is selected as the demanded torque, and at the same time, the optimum torque is larger than the actual torque, regenerative current is caused to be generated for regeneration of energy (specifically, electrical energy).

In the above publication, it is not clearly shown that the regeneration of electrical energy is carried out during deceleration of the vehicle. However, it is presumed that when conditions for generating the regenerative current are fulfilled during deceleration of the vehicle, the regeneration of electrical energy is permitted. However, during deceleration of the vehicle, normally, the engine has its throttle valve fully closed, and hence there occurs a pumping loss, which prevents the vehicle's kinetic energy from being efficiently utilized for regeneration of electrical energy.

SUMMARY OF THE INVENTION

It is an object of the invention to provide a control system for a hybrid vehicle, which is capable of reducing a kinetic energy loss occurring when regeneration of electrical energy is carried out during deceleration of the vehicle, thereby enhancing the efficiency of regeneration of electrical energy.

To attain the above object, the present invention provides a control system for a hybrid vehicle including an internal combustion engine, a drive shaft driven by the engine, a generator for converting kinetic energy of the drive shaft to electrical energy to generate electric power, and electrical storage means for storing electrical energy output from the generator.

The control system according to the invention is characterized by comprising:

deceleration-detecting means for detecting deceleration of the engine;

fuel supply-interrupting means for interrupting supply of fuel to the engine during the deceleration of the engine;

intake air amount control means for controlling an amount of intake air supplied to the engine such that the amount of intake air supplied to the engine is increased when the generator regenerates electrical energy during the deceleration of the engine;

regeneration amount-calculating means for calculating an amount of electrical energy to be regenerated by the generator during the deceleration of the engine; and output control means for controlling an output from the generator, based on the amount of electrical energy calculated by the regeneration amount-calculating means.

Preferably, the control system includes remaining charge-detecting means for detecting an amount of remaining charge in the electrical storage means, and the regeneration amount-calculating means limits the amount of electrical energy to be regenerated, depending on the amount of remaining charge in the storage battery means detected by the remaining charge-detecting means.

Also preferably, the control system includes temperature-detecting means for detecting a temperature of the output control means, and the regeneration amount-calculating means limits the amount of electrical energy to be regenerated, depending on the temperature of the output control means detected by the temperature-detecting means.

More preferably, when the amount of remaining charge in the battery storage means is substantially equal to an amount of charge to be stored in the electrical storage means when the electrical storage means is fully charged, the regeneration amount-calculating means sets the amount of electrical energy to be regenerated by the generator to zero.

Preferably, the engine includes an intake passage, and a throttle valve arranged in the intake passage, the intake air amount control means causing the throttle valve to be fully opened when the generator regenerates the electrical energy during the deceleration of the engine.

More preferably, the hybrid vehicle has a transmission connected to the engine, the control system including engine rotational speed-detecting means for detecting rotational speed of the engine, means for detecting a parameter representative of a gear reduction ratio of the transmission, and extra output-calculating means for calculating an extra output from the engine in excess of running resistance of the hybrid vehicle, the regeneration amount-calculating means calculating the amount of electrical energy to be regenerated by the generator during the deceleration of the engine by adding a predetermined amount corresponding to a fully-opened state of the throttle valve to an amount of electrical energy to be regenerated by the generator, which is determined based on the rotational speed of the engine, the gear reduction ratio of the transmission, and the extra output from the engine.

Further preferably, the control system includes vehicle speed-detecting means for detecting traveling speed of the hybrid vehicle, and the running resistance of the hybrid vehicle is determined based on the vehicle speed detected by the vehicle speed detecting means, the extra output-calculating means calculating the extra output from the engine by subtracting the running resistance of the vehicle from an engine demanded output dependent on the rotational speed of the engine and load on the engine.

In a still more preferable embodiment, the control system includes throttle valve opening-detecting means for detecting opening of the throttle valve, and the load on the engine is determined from the opening of the throttle valve opening.

In another still more preferable embodiment, the hybrid vehicle includes an accelerator pedal, and the control system includes accelerator pedal opening-detecting means for detecting opening of the accelerator pedal corresponding to an accelerator pedal travel exerted by a driver, the load on the engine being determined from the opening of the accelerator pedal.

Preferably, the generator also serves as a motor operable on electrical energy from the electrical storage means, for assisting the engine.

The above and other objects, features, and advantages of the invention will become more apparent from the following detailed description taken in conjunction with the accompanying drawings.

BRIEF DESCRIPTION OF THE DRAWINGS

FIG. 16 is a flowchart showing a subroutine for decelerating regeneration processing;

DETAILED DESCRIPTION

The invention will now be described in detail with reference to the drawings showing an embodiment thereof.

Figure 1:
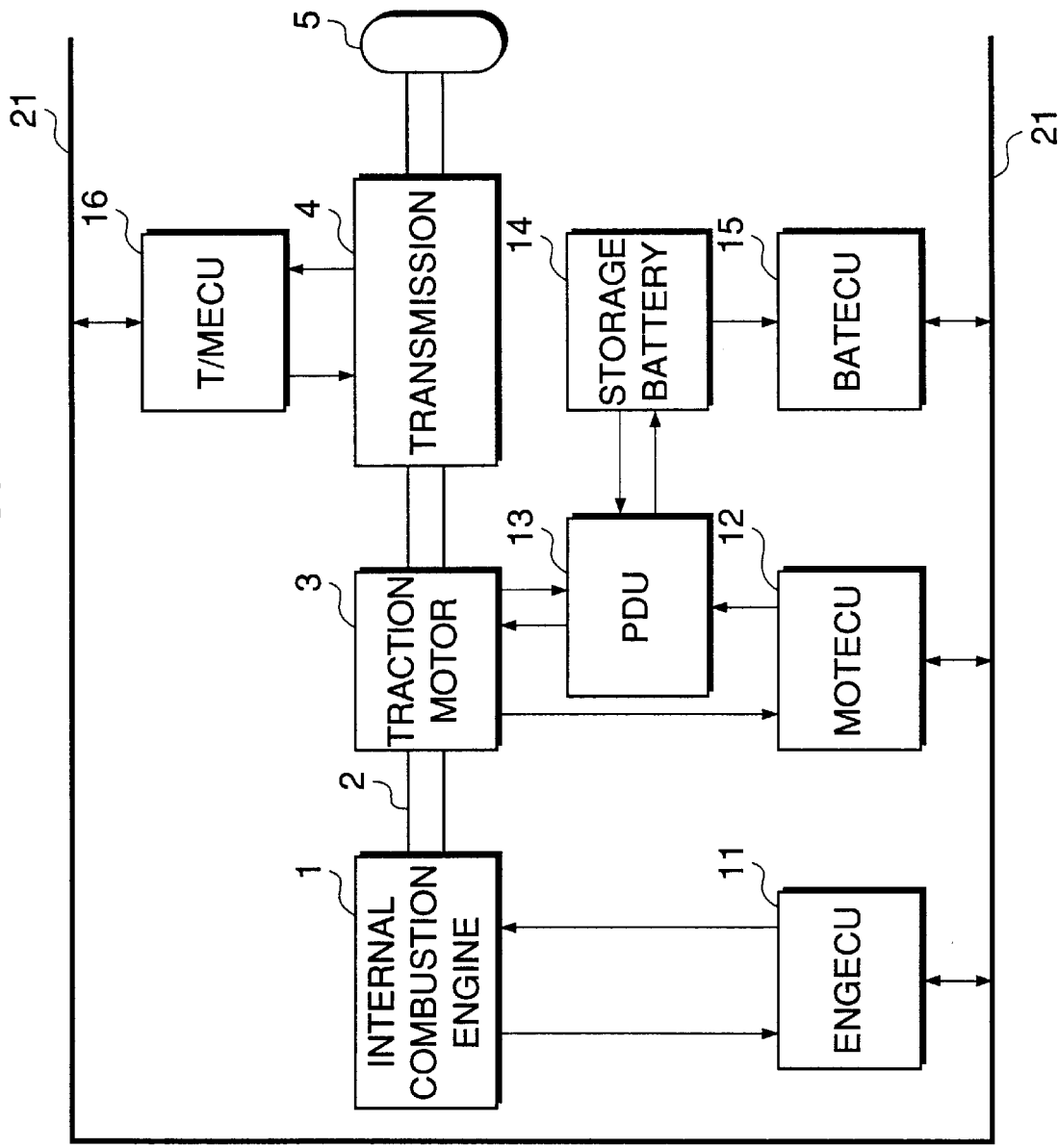
FIG. 1 is a block diagram schematically showing the whole arrangement of a drive system of a hybrid vehicle, and a control system therefor, according to an embodiment of the invention.

Referring first to FIG. 1, there is schematically shown the arrangement of a drive system for a hybrid vehicle, and a control system therefor (sensors, actuators, and other components associated therewith are omitted), according to an embodiment of the invention.

As shown in the figure, an internal combustion engine (hereinafter simply referred to as "the engine") 1 rotatively drives a drive shaft 2 to transmit torque via a transmission 4 to driving wheels 5 to rotatively drive the same. A traction motor 3 is arranged on the drive shaft 2 such that the former can directly drive the latter for rotation. The traction motor 3 serves not only as a prime mover for assisting the engine 1 but also as a generator for performing a regenerative function of converting part of vehicle's kinetic energy transmitted from the rotating drive shaft 2 into electrical energy, and outputting the electrical energy to recharge a storage battery 14 electrically connected thereto via a power drive unit (hereinafter referred to as "the PDU") 13. The traction motor 3 has its operation controlled by a control signal received via the PDU 13.

The control system includes an electronic control unit (hereinafter referred to as "ENGECU") 11 for controlling the engine 1, an electronic control unit (hereinafter referred to as "MOTECU") 12 for controlling the traction motor 3, an electronic control unit (hereinafter referred to as "BATECU") 15 for controlling the storage battery 14, and an electronic control unit (hereinafter referred to as "T/MECU") 16 for controlling the transmission 4. These ECU's are connected to each other via a data bus 21, and transmit data of detected parameters, information on flags, etc. to each other.

Figure 2:
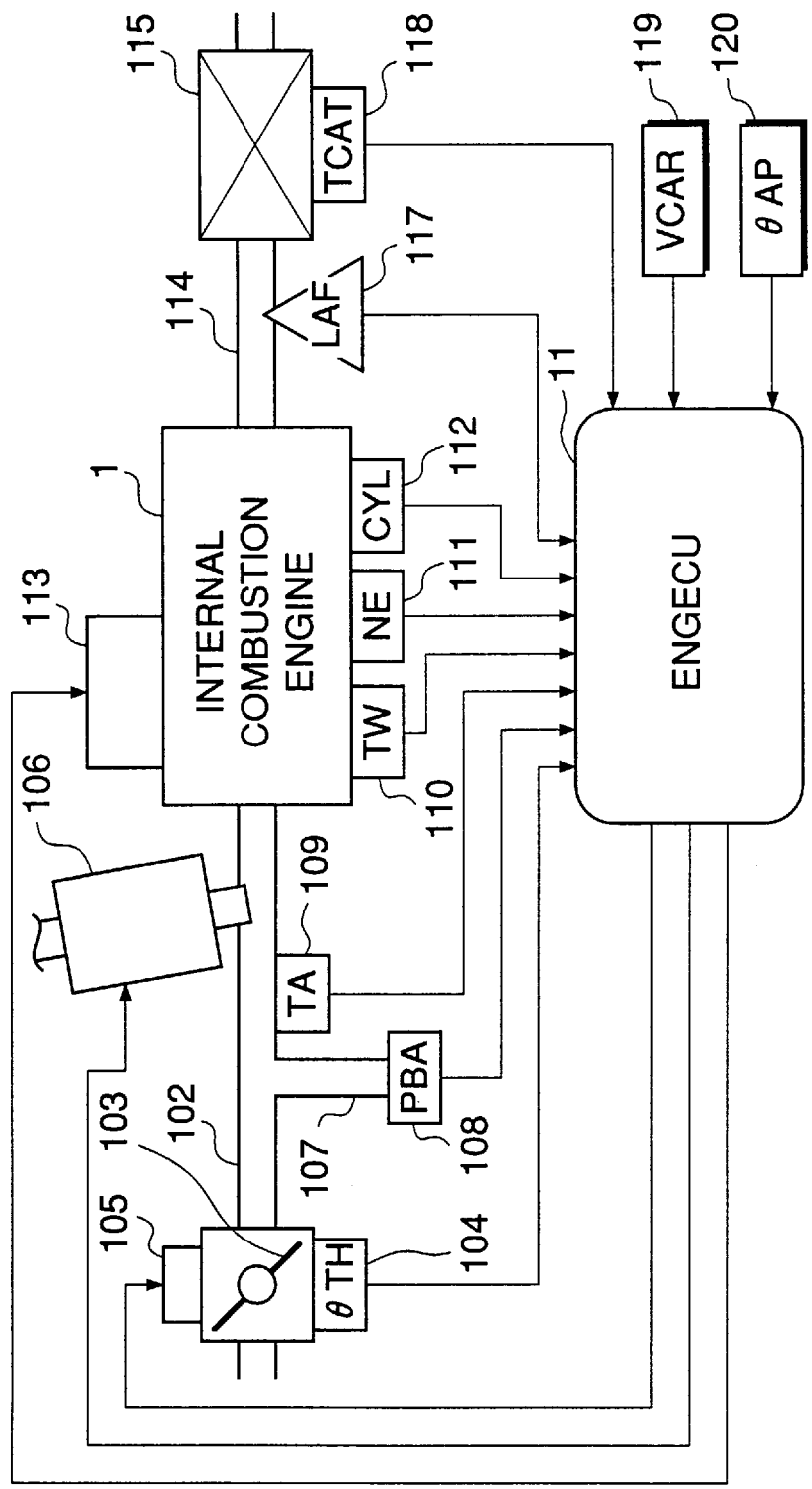
FIG. 2 is a block diagram schematically showing the arrangement of an internal combustion engine and a control system therefor.

FIG. 2 shows the arrangement of the engine 1, the ENGECU 11, and peripheral devices associated therewith. Connected to the cylinder block of the engine is an intake pipe 102 in which is arranged a throttle valve 103. A throttle valve opening (θTH) sensor 104 is connected to the throttle valve 103, for generating an electric signal indicative of the sensed throttle valve opening θTH and supplying the same to the ENGECU 11. The throttle valve 103 is a so-called drive-by-wire type (DBW) and connected to a throttle actuator 105 to have the valve opening θTH thereof electrically controlled thereby. The throttle actuator 105 has its operation controlled by a signal from the ENGECU 11.

Fuel injection valves 106, only one of which is shown, are inserted into the intake pipe 102 at locations intermediate between the cylinder block of the engine 1 and the throttle valve 103 and slightly upstream of respective corresponding intake valves, not shown. The fuel injection valves 106 are connected to a fuel pump via a pressure regulator, neither of which is shown, and electrically connected to the ENGECU 11 to have their valve opening periods and valve opening timing controlled by signals therefrom.

On the other hand, an intake pipe absolute pressure (PBA) sensor 108 is provided in communication with the interior of the intake pipe 102 via a conduit 107 at a location immediately downstream of the throttle valve 103, for supplying an electric signal indicative of the sensed absolute pressure PEA within the intake pipe 102 to the ENGECU 11.

An intake air temperature (TA) sensor 109 is inserted into the intake pipe 102 at a location downstream of the conduit 107, for supplying an electric signal indicative of the sensed intake air temperature TA to the ENGECU 11.

An engine coolant temperature (TW) sensor 110, which may be formed of a thermistor or the like, is mounted in the cylinder block of the engine 1, for supplying an electric signal indicative of the sensed engine coolant temperature TW to the ENGECU 11.

An engine rotational speed (NE) sensor 111 is arranged in facing relation to a camshaft or a crankshaft of the engine 1, neither of which is shown. The engine rotational speed (NE) sensor 111 generates a pulse (hereinafter referred to as "the TDC signal pulse") at a predetermined crank angle position of each cylinder a predetermined angle before a TDC position of the cylinder corresponding to the start of the intake stroke thereof whenever the crankshaft rotates through 180 degrees. The TDC signal pulse is supplied to the ENGECU 11.

The engine 1 has spark plugs 113 respectively provided for the cylinders and each connected to the ENGECU 11 to have its ignition timing controlled by a signal therefrom.

A three-way catalyst 115 is arranged within an exhaust pipe 114 connected to the cylinder block of the engine 1, for purifying noxious components such as HC, CO, and NOx. A linear output type air-fuel ratio sensor (hereinafter referred to as "the LAF sensor") 117 is arranged in the exhaust pipe 114 at a location upstream of the three-way catalyst 115. The LAF sensor 117 supplies an electric signal which is substantially proportional to the concentration of oxygen present in exhaust gases to the ENGECU 11. The LAF sensor 117 is capable of detecting the air-fuel ratio of a mixture supplied to the engine 1 over a wide range from a leaner side to a richer side.

The three-way catalyst 115 has a catalyst temperature (TCAT) sensor 118 provided therefor, of which an output signal indicative of the sensed catalyst temperature TCAT is supplied to the ENGECU 11. Further, a vehicle speed sensor 119 for detecting a vehicle speed VCAR at which the vehicle is traveling and an accelerator opening sensor 120 for detecting an accelerator pedal travel exerted by the driver (hereinafter referred to as "accelerator opening") θAP are connected to the ENGECU 11, and signals indicative of the sensed vehicle speed VCAR and the sensed accelerator opening θAP are supplied to the ENGECU 11.

The ENGECU 11 is comprised of an input circuit, not shown, which has the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), not shown, a memory device, not shown, which stores various operational programs which are executed by the CPU, and results of calculations therefrom, etc., and an output circuit, not shown, which outputs driving signals to the fuel injection valves 106, the spark plugs 113, etc. The construction of each of the other ECU's is basically similar to that of the ENGECU 11.

Figure 3:
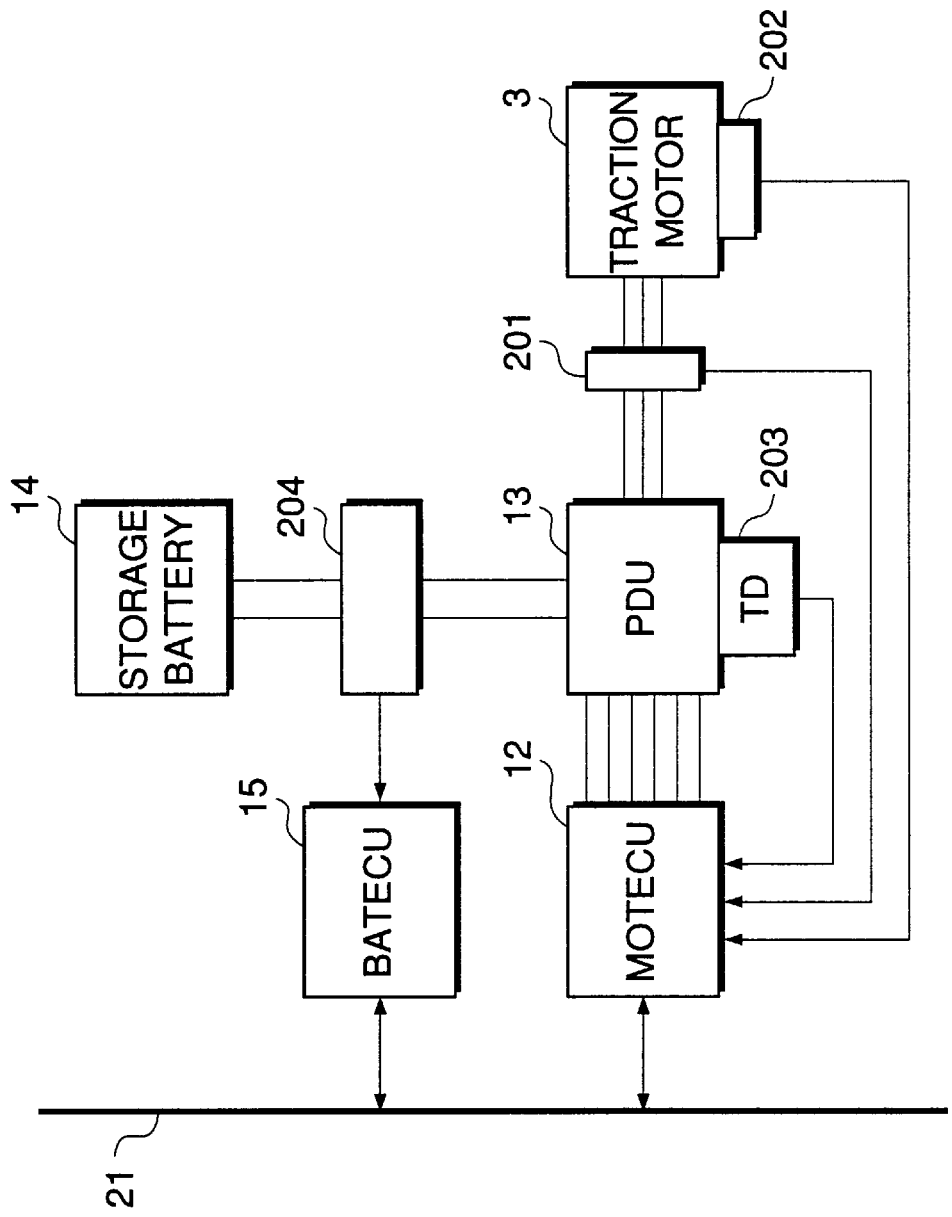
FIG. 3 is a block diagram schematically showing the arrangement of a traction motor and a control system therefor.

FIG. 3 shows details of the connection of the traction motor 3, the PDU 13, the storage battery 14, the MOTECU 12, and the BATECU 15.

The traction motor 3 has a motor rotational speed sensor 202 arranged thereon for detecting the rotational speed of the traction motor 3, of which an output signal indicative of the sensed motor rotational speed is supplied to the MOTECU 12. Arranged on lines electrically connecting between the PDU 13 and the traction motor 3 is a current/voltage sensor 201 for detecting voltage and current of electricity supplied to or generated from the traction motor 3. Further, the PDU 13 has a temperature sensor 203 arranged thereon for detecting the temperature TD of a protective resistance of a drive circuit, not shown, of the traction motor 3. These sensors 201, 203 supply signals indicative of the respective detected parameters to the MOTECU 12.

Arranged on lines electrically connecting between the storage battery 14 and the PDU 13 is a voltage/current sensor 204 for detecting voltage across output terminals of the storage battery 14 and electric current flowing from or into the storage battery 14, of which output signals indicative of the sensed voltage and the sensed electric current are supplied to the BATECU 15.

Figure 4:
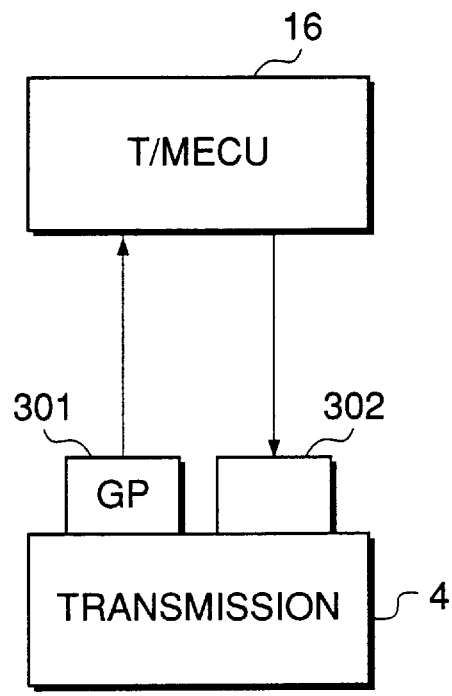
FIG. 4 is a block diagram schematically showing the arrangement of a transmission and a control system therefor.

FIG. 4 shows the connection between the transmission 4 and the T/MECU 16. The transmission 4 has a gear position sensor 301 arranged thereon for detecting a gear position GP of the transmission 4, of which an output signal indicative of the sensed gear position is supplied to the T/MECU 16. If the transmission 4 is of AT (automatic transmission) type, it has a transmission actuator 302 arranged thereon to have its operation controlled via the transmission actuator 302 by a signal from the T/MECU 16.

Figure 5:
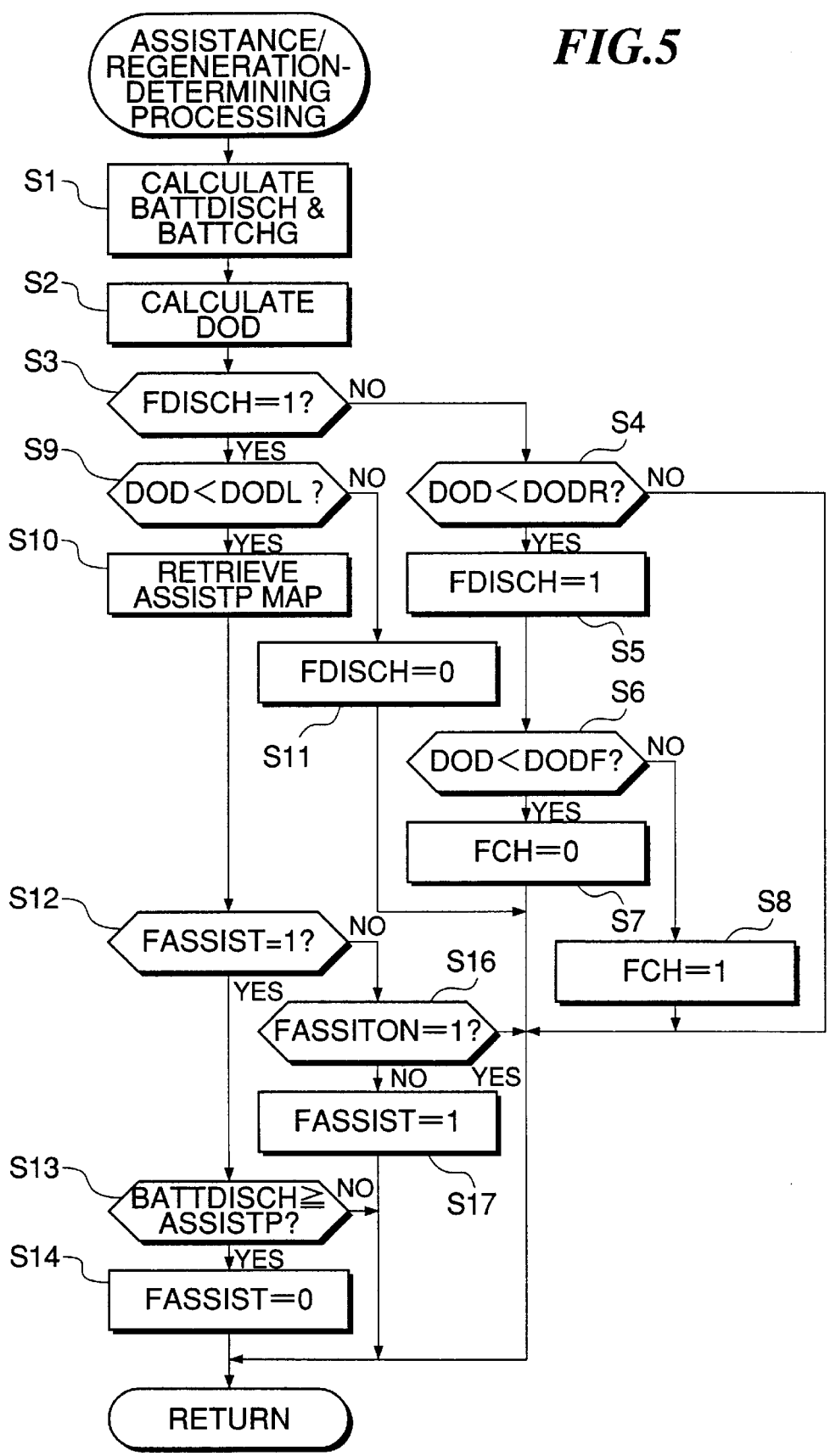
FIG. 5 is a flowchart showing a program for assistance/ regeneration-determining processing in which whether the assistance of the traction motor to the engine or the regeneration of electrical energy by the traction motor should be carried out is determined based on the amount of remaining charge in a storage battery.

FIG. 5 shows a program for assistance/regeneration-determining processing, which is executed by the BATECU 15 e.g. at predetermined time intervals.

First, at a step S1, a cumulative discharge value BATT-DISCH and a cumulative charge value BATTCHG are calculated. More specifically, output current from the storage battery 14 and input current (charging current) flowing into the same are detected by the current/voltage sensor 204, and a cumulative value of the former (BATTDISCH) and a cumulative value of the latter (BATTCHG) are calculated whenever the present processing is carried out. In the present embodiment, the cumulative discharge value BATTDISCH assumes a positive value while the cumulative charge value BATTCHG assume a negative value. Further, the cumulative discharge value BATTDISCH is reset when the assistance of the traction motor 3 to the engine 1 is started (at a step S49 in FIG. 11), while the cumulative charge value BATTCHG is reset when the regeneration of electrical energy by the traction motor 3 is started (at a step S73 in FIG. 12).

At the following step S2, a depth of discharge DOD of the storage battery 14 is calculated. More specifically, provided that BATTFULL represents the capacity of the storage battery 14, i.e. an amount of electric charge which the storage battery 14 can discharge when it is in its fully-charged state, the depth of discharge DOD can be calculated by the use of the following equation (1):

$$DOD=(BATTDISCH+BATTCHG)/BATTFULL \qquad (1)$$

Accordingly, a remaining charge BATTREM in the storage battery 14 can be calculated by an equation of BATTREM=BATTFULL−(BATTDISCH+BATTCHG), and a remaining charge ratio RREM by an equation of RREM= BATTREM/BATTFULL=1−DOD.

At a step S3, it is determined whether or not a discharge-permitting flag FDISCH, which, when set to "1", indicates that discharging of the storage battery 14 is permitted, assumes "1". If FDISCH=1 holds, it is determined at a step S9 whether or not the depth of discharge DOD is smaller than a predetermined reference value DODL which corresponds to a lower limit of the amount of electric charge stored in the storage battery 14. If DOD≧DODL holds, which means that the remaining charge BATTREM in the storage battery 14 is small, the discharge-permitting flag FDISCH is set to "0" at a step S11 to thereby inhibit discharging of the storage battery 14, followed by terminating the program.

Figure 6:
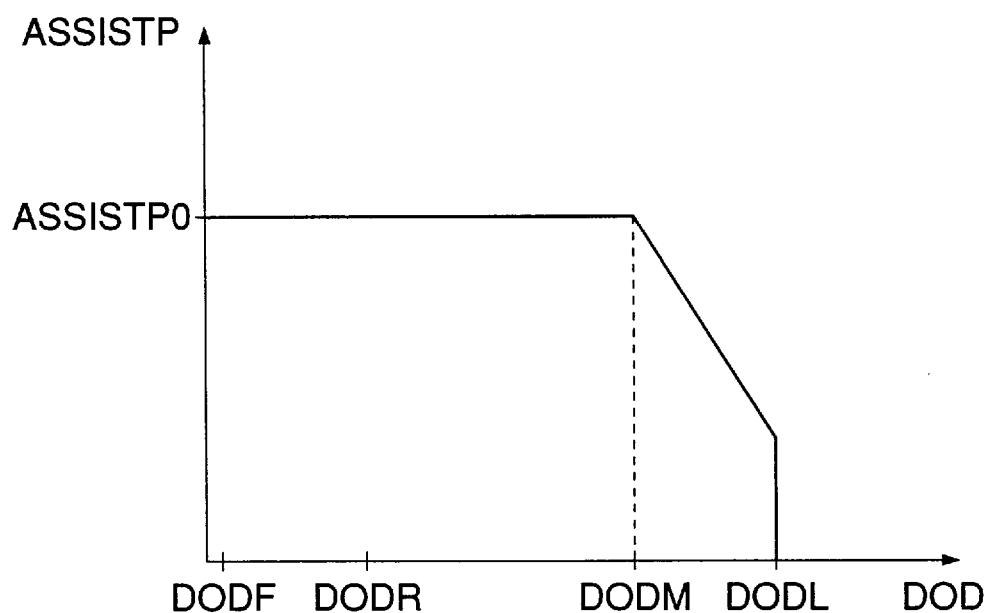
FIG. 6 shows an ASSISTP map for use in the FIG. 5 processing.

If DOD<DODL holds at the step S9, an ASSISTP map is retrieved according to the depth of discharge DOD at a step S10 to determine an allowable amount of discharge ASSISTP. The ASSISTP map is set, e.g. as shown in FIG. 6, such that until the depth of discharge DOD reaches a predetermined reference value DODM corresponding to a medium amount of charge in the storage battery 14, the allowable amount of discharge ASSISTP is set to a predetermined fixed value ASSISTP0, and when the depth of discharge DOD is within a range of the predetermined reference value DODM to the predetermined reference value DODL, the ASSISTP value is set to a smaller value as the depth of discharge DOD increases.

At the following step S12, an assistance-permitting flag FASSIST, which, when set to 1, indicates that the traction motor 3 is permitted to assist the engine 1 in providing torque to the driving wheels 5, assumes "1". If FASSIST=1 holds, it is determined at a step S13 whether or not the cumulative discharge value BATTDISCH is equal to or larger than the allowable amount of discharge ASSISTP. If BATTDISCH<ASSISTP holds, the program is immediately terminated, i.e. the assistance of the traction motor 3 to the engine 1 continues to be permitted, whereas if BATTDISCH≧ASSISTP holds, the assistance-permitting flag FASSIST is set to "0" at a step S14 to thereby inhibit the assistance of the traction motor 3, followed by terminating the program.

The steps S13 and S14 make it possible to prevent the storage battery 14 from being excessively discharged, since the assistance of the traction motor 3 is inhibited when the cumulative discharge value BATTDISCH is equal to or larger than the allowable amount of discharge ASSISTP.

On the other hand, if FASSIST=0 holds at the step S12, which means that the assistance of the traction motor 3 is not permitted, it is determined at a step S16 whether or not an assistance-executing flag FASSISTON, which, when set to 1, indicates that the assistance of the traction motor 1 is being executed, assumes "1". If FASSISTON=1 holds, the program is immediately terminated, whereas if FASSISTON=0 holds, the assistance-permitting flag FASSIST is set to "1" at a step S17, followed by terminating the program.

If FDISCH=0 holds at the step S3, which means that discharging of the storage battery 14 is not permitted, it is determined at a step S4 whether or not the depth of discharge DOD is smaller than a predetermined reference value DODR at or below which a dischargeable state of the storage battery 14 is permitted to be restored. If DOD≧DODR holds, the program is immediately terminated to continue inhibition of discharging of the storage battery 14, whereas if DOD<DODR holds, the discharge-permitting flag FDISCH is set to "1" at a step S5, and further it is determined at a step S6 whether or not the depth of discharge DOD is smaller than a predetermined reference value DODF indicative of a substantially fully-charged state of the storage battery 14 (see FIG. 6). If DOD≧DODF holds, which means that the storage battery 14 is not fully charged, a charge-permitting flag FCH is set to "1" at a step S8, thereby permitting charging or recharging of the storage battery 14, whereas if DOD<DODF holds, which means that the storage battery 14 is substantially fully charged, the charge-permitting flag FCH is set to "0" at a step S7, thereby inhibiting charging of the storage battery, followed by terminating the program.

Figure 7:
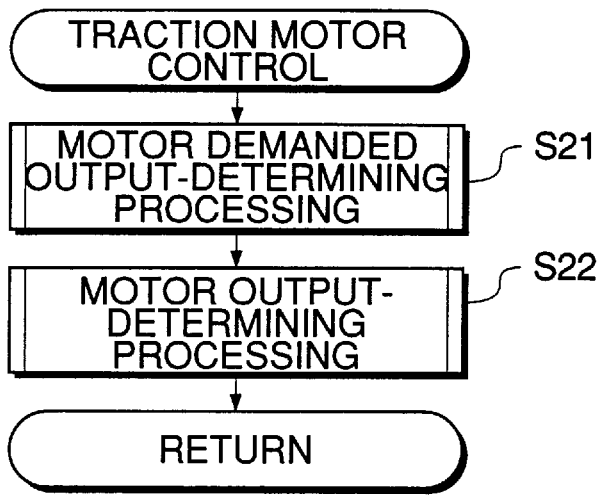
FIG. 7 is a flowchart showing a program for overall traction motor control.

Next, FIG. 7 shows a program for traction motor control processing, which is executed by the MOTECU 12 at predetermined time intervals. This program comprises two steps: a step S21 for executing motor demanded output-determining processing (subroutine shown in FIG. 8), and a step S22 for executing motor output-determining processing (subroutine shown in FIGS. 11 and 12).

Figure 8:
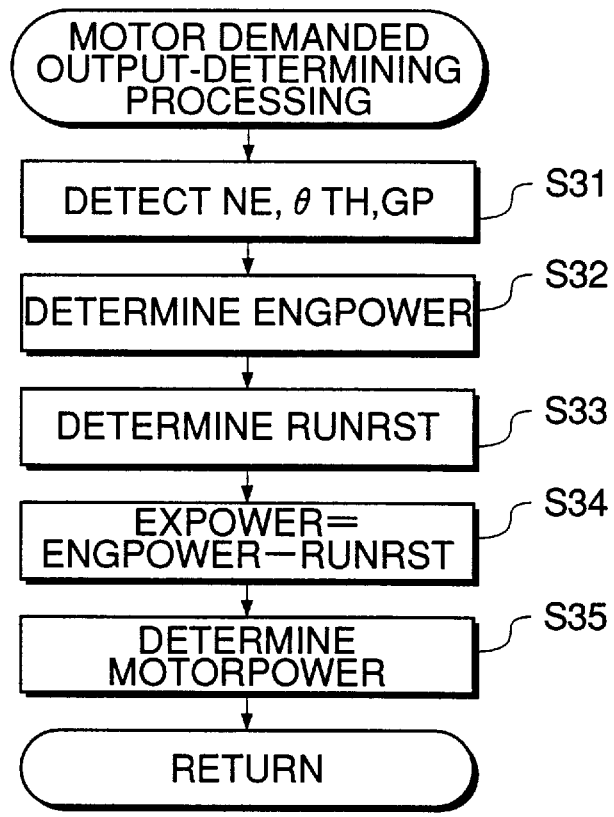
FIG. 8 is a flowchart showing a routine for motor demanded output-determining processing.

Referring to the FIG. 8 subroutine for the motor demanded output-determining processing, first, at a step S31, the engine rotational speed NE, the throttle valve opening θTH (or alternatively the accelerator opening θAP), and the gear position GP are detected at a step S31. Then, an ENGPOWER map is retrieved according to detected values of these parameters to determine an engine demanded output ENGPOWER, i.e. an engine output demanded by the driver of the vehicle, at a step S32.

Figure 9:
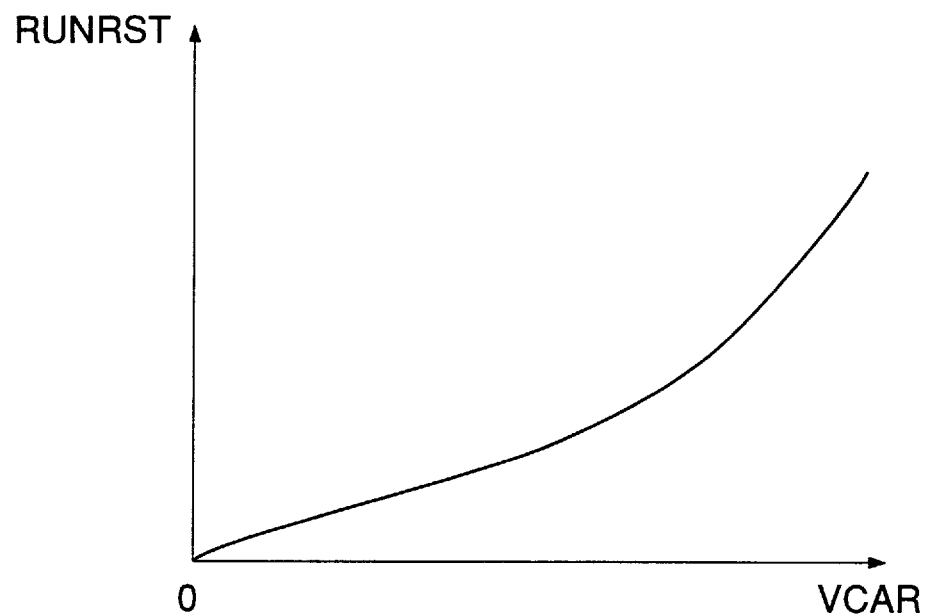
FIG. 9 shows a RUNRST table for determining running resistance of the vehicle.

At the following step S33, a RUNRST table is retrieved according to the vehicle speed VCAR to determine a running resistance RUNRST, i.e. a resistance which the vehicle receives when it travels. The RUNRST table is set, e.g. as shown in FIG. 9, such that as the vehicle speed VCAR increases, the running resistance RUNRST assumes a higher value. Then, an extra output EXPOWER is calculated by subtracting the running resistance RUNRST from the engine demanded output ENGPOWER. In the above determinations and calculation, the engine demanded output ENGPOWER and the running resistance RUNRST are both measured in watts (W).

Figure 10:
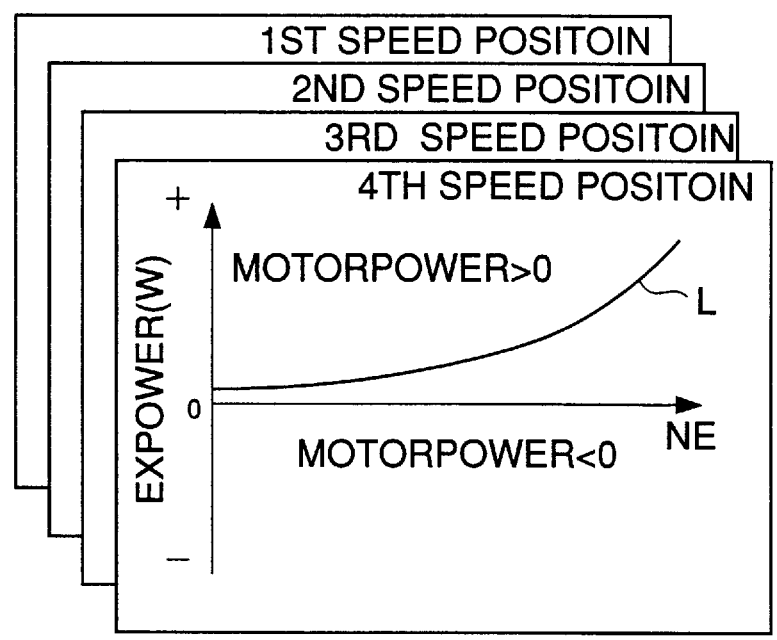
FIG. 10 shows a MORTORPOWER map for determining motor demanded output.

At the following step S35, a MOTORPOWER map is retrieved according to the gear position GP, the engine rotational speed NE, and the extra output EXPOWER to determine motor demanded output MOTORPOWER. The MOTORPOWER map is set, e.g. as shown in FIG. 10, such that a plurality of MOTORPOWER maps are provided in a manner dependent on the gear position GP, i.e., they are selected when the gear position is a first speed position, a second speed position, a third speed position, and a fourth speed position, respectively. Further, in an area above a curve L in each MOTORPOWER map, i.e. in an operating region in which the extra output EXPOWER is large, the motor demanded output MOTORPOWER is set to a positive value (MOTOPOER>0 ), thereby permitting the assistance of the traction motor 3, whereas in an area below the curve L, i.e. in an operating region in which the extra output EXPOWER assumes a small positive value or a negative value, the motor demanded output MOTORPOWER is set to a negative value (MOTORPOWR<0 ), thereby permitting regeneration of electrical energy by the traction motor 3. As shown in FIG. 10, the curve L progressively rises with an increase in the engine rotational speed NE, which means that as the engine rotational speed NE is higher, the motor demanded output MOTORPOWER is set to a positive value relative to a larger value of the extra output EXPOWER, i.e. the assistance of the traction motor 3 is permitted.

As described-above, according to the FIG. 8 processing, the extra output EXPOWER of the engine is calculated by subtracting the running resistance RUNRST from the engine demanded output ENGPOWER, and the motor demanded output MOTORPOWER is calculated according to the extra output EXPOWER and the engine rotational speed NE.

Figure 11:
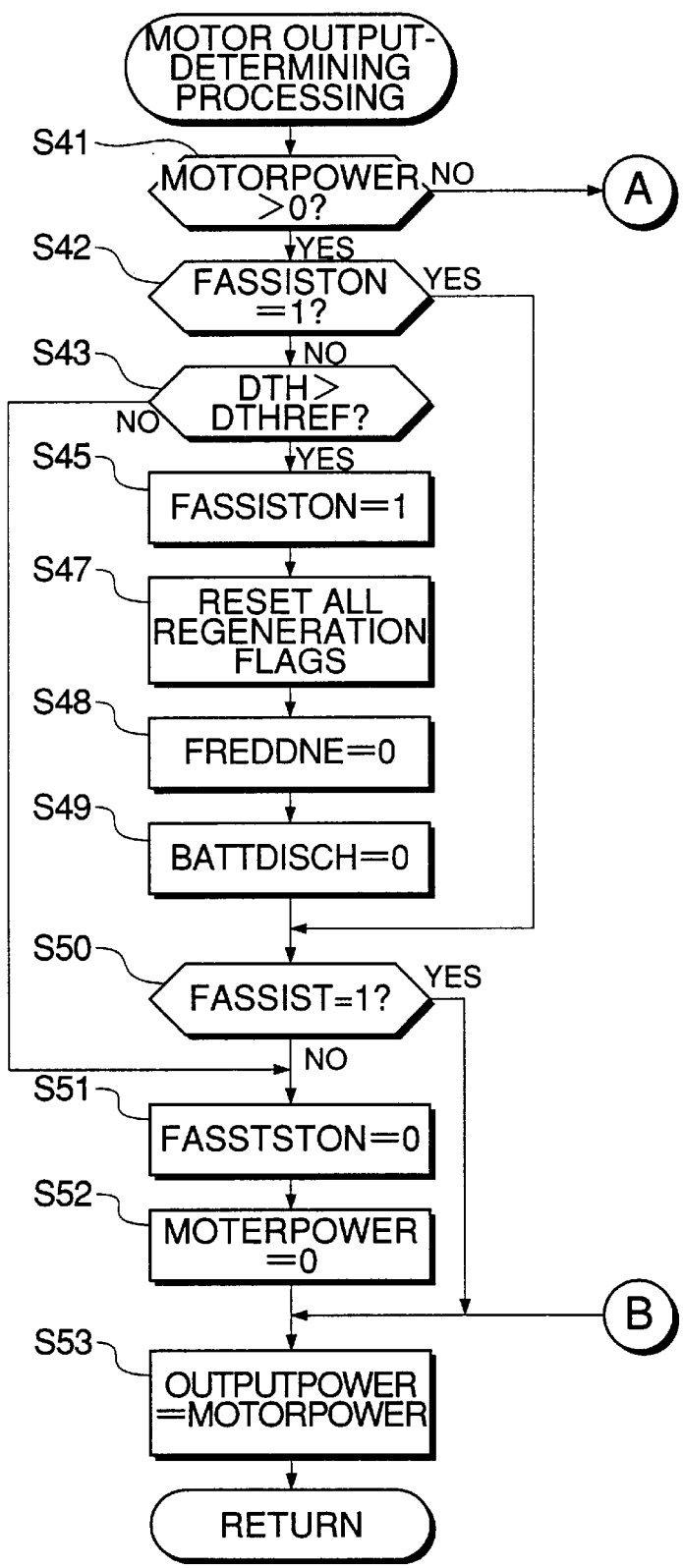
FIG. 11 is a flowchart showing a routine for motor output-determining processing.
Figure 12:
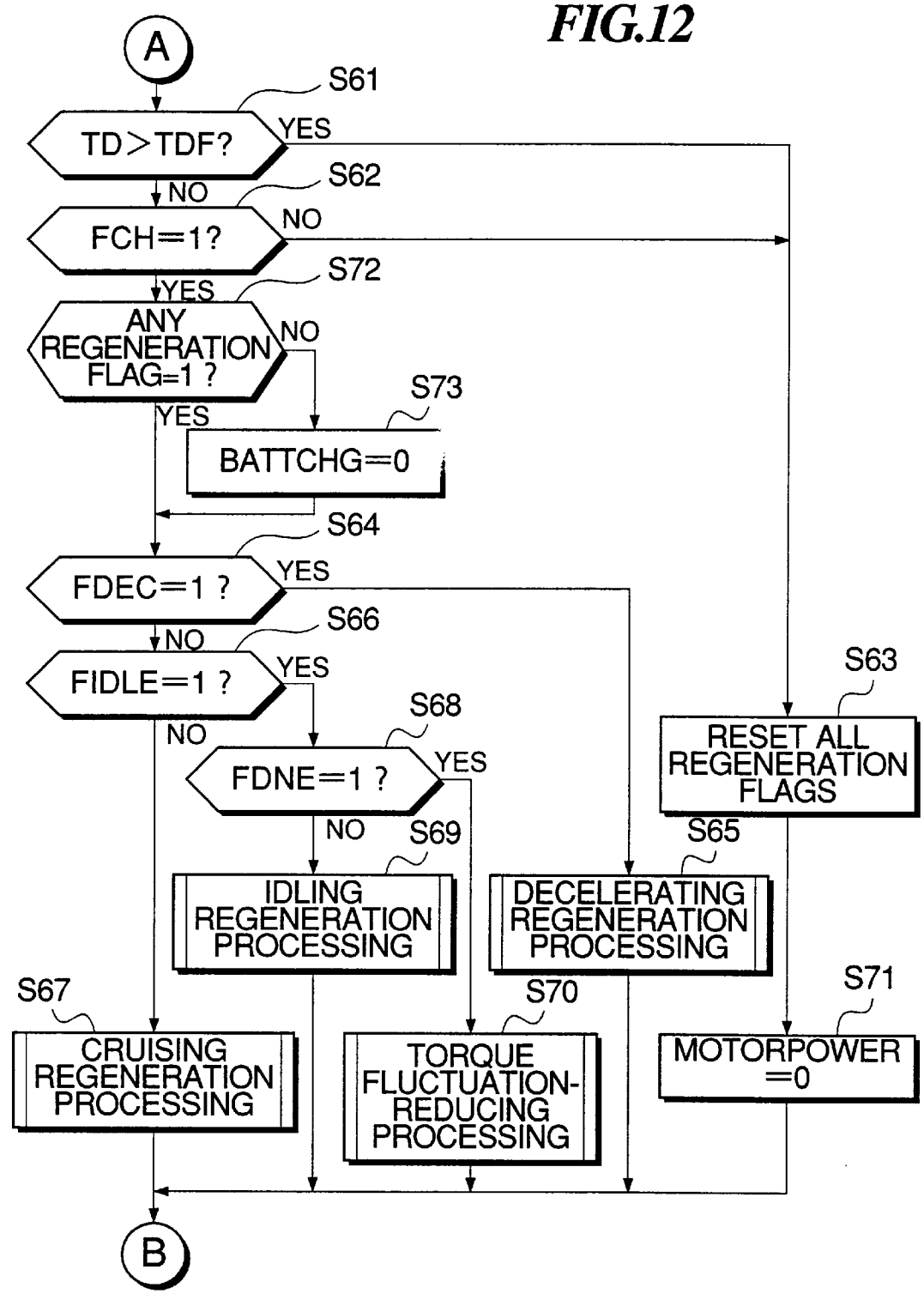
FIG. 12 is a continued part of the FIG. 11 flowchart.

FIGS. 11 and 12 show details of the subroutine for the motor output-determining processing which is executed at the step S22 in FIG. 7.

First, at a step S41, it is determined whether or not the motor demanded output MOTORPOWER is larger than "0". If MOTORPOWER>0 holds, it is determined at a step S42 whether or not the assistance-executing flag FASSISTON assumes "1". If FASSISTON=1 holds, which means that the assistance of the traction motor 3 to the engine 1 is being executed, the program proceeds to a step S50, whereas if FASSISTON=0 holds, which means that the assistance of the traction motor 3 is not being executed, it is determined at a step S43 whether or not an amount of change DTH in the throttle valve opening θTH detected is larger than a predetermined value DTHREF (>0).

If DTH≦DTHREF holds, the program jumps to a step S51, whereas if DTH>DTHREF holds, which means that acceleration of the engine 1 is being demanded, the assistance-executing flag FASSISTON is set to "1" at a step S45, and then the program proceeds to a step S47.

At the step S47, all kinds of regeneration flags (which are set to "1" when the regeneration of electrical energy by the traction motor 3 is executed), i.e. a higher-rate cruising regeneration flag FHCRUREG, a lower-rate cruising regeneration flag FLCRUREG, an idling cruising regeneration flag FIDLEREG, and a decelerating regeneration flag FDREG, are all set to "0". Then, a fluctuation-reducing flag FREDDNE, which, when set to "1", indicates that torque fluctuation-reducing processing (step S70 in FIG. 12) is being executed, is set to "0" at a step S48, and the cumulative discharge value BATTDISCH is reset to "0" at the step S49, followed by the program proceeding to the step S50.

At the step S50, it is determined whether or not the assistance-permitting flag FASSIST assumes "1". If FASSIST=1 holds, the program jumps to a step S53, whereas if FASSIST=0 holds, the program proceeds to the step S51.

At the step S51, the assistance-executing flag FASSISTON is set to "0", and the motor demanded output MOTORPOWER is set to "0" at a step S52. Then, the program proceeds to the step S53, wherein the motor output OUTPUTPOWER is set to the motor demanded output MOTORPOWER, followed by terminating the program.

According to the above steps S42 to S52, so long as the motor demanded output MOTORPOWER>0 holds, the drive system of the hybrid vehicle is controlled in the following manner:

1) Even if MOTORPOWER>0 holds, the assistance of the traction motor 3 to the engine 1 is inhibited unless the acceleration of the engine is demanded (steps S43, S51, and S52); and
2) When the acceleration of the engine is demanded, if leaning operation of the engine 1 and assistance of the traction motor 3 to the engine 1 are permitted, as will be described in detail with reference to FIGS. 20 and 21, the drive system of the hybrid vehicle is operated with the assistance of the traction motor 3 to the engine 1 such that the air-fuel ratio of the mixture supplied to the engine 1 is controlled to a fixed lean value or a lean value dependent on the amount of assistance of the traction motor 3 to the engine 1, whereas if the leaning operation of the engine 1 and assistance of the traction motor 3 to the engine 1 are not permitted, the drive system of the hybrid vehicle is operated with the assistance of the traction motor 3 to the engine 1 such that the air-fuel ratio of the mixture is normally controlled to a stoichiometric value.

If MOTORPOWER≦0 holds at the step S41, the program proceeds to a step S61 in FIG. 12, wherein it is determined whether or not the temperature TD of the protective resistance of the PDU 13 is higher than a predetermined value TDF. If TD>TDF holds, there is a fear that the temperature of the drive circuit of the traction motor 3 becomes too high if the regeneration of electrical energy by the traction motor 3 is executed, so that all kinds of regeneration flags are set to "0" at a step S63 to thereby inhibit the regeneration, and further the motor demanded output MOTORPOWER is set to "0" at a step S71, followed by the program proceeding to the step S53 in FIG. 11. This makes it possible to prevent the temperature of the drive circuit of the PDU 13 from becoming excessively high.

On the other hand, if TD≦TDF holds at the step S61, it is determined at a step S62 whether or not the charge-permitting flag FCH assumes "1". If FCH=0 holds, which means that charging or recharging of the storage battery 14 is not permitted, the program proceeds to the step S63 to thereby inhibit the regeneration. This makes it possible to prevent excessive charging of the storage battery 14, heat loss of the PDU 13 due to excessive charging of the storage battery 14, and other inconveniences.

If FCH=1 holds at the step S62, which means that the charging of the storage battery 14 is permitted, it is determined at a step S72 whether any of the regeneration flags FLCRUREG, FHCRUREG, FIDLEREG, and FDREG assumes "1". If any of these flags assumes "1", the program jumps to a step S64, whereas if all the regeneration flags assume "0", the cumulative charge value BATTCHG is set to "0" at the step S73, and then the program proceeds to the step S64.

At the step S64, it is determined whether or not a deceleration flag FDEC, which, when set to "1", indicates that deceleration of the engine 1 is being demanded (see steps S144 to S146 in FIG. 19), assumes "1". If FDEC=1 holds, decelerating regeneration processing is carried out at a step S65 (by executing a subroutine shown in FIG. 16), and then the program proceeds to the step S53.

If FDEC=0 holds, which means that deceleration of the engine 1 is not being demanded, it is determined at a step S66 whether or not an idling flag FIDLE, which, when set to "1", indicates that the engine 1 is idling (see steps S151 to S155 in FIG. 19), assumes "1". If FIDLE=0 holds, which means that the engine is not idling, cruising regeneration processing is carried out at a step S67 (by executing a subroutine shown in FIG. 13), and then the program proceeds to the step S53.

If FIDLE=1 holds at the step S66, it is determined at a step S68 whether or not a rotation fluctuation flag FDNE, which, when set to "1", indicates that the rotational speed of the engine 1 largely fluctuates, assumes "1". If FDNE=1 holds, the torque fluctuation-reducing processing is carried out at the step S70 (by executing a subroutine shown in FIG. 17), whereas if FDNE=0 holds, idling regeneration processing is carried out at a step S69 (by executing a subroutine shown in FIG. 14), and then the program proceeds to the step S53.

As described above, according to the motor output-determining processing in FIGS. 11 and 12, the traction motor 3 is selectively set to one of an assisting mode in which the traction motor 3 assists the engine 1 (by the steps S44 to S50, and S53), a regenerative mode in which the regeneration of electrical energy is executed (by the steps S65, S67, and S69), and a zero output mode in which the traction motor 3 generates no output (by the steps S52 and S71), based on the motor demanded output MOTOR-POWER determined in the FIG. 8 processing, and in dependence on the states of the assistance-permitting flag FASSIST and the charge-permitting flag FCH both set in dependence on the amount of remaining charge in the storage battery 14. This makes it possible to control the traction motor 3 such that it performs the assistance of the engine 1 and regeneration of electrical energy in a suitable manner, whereby fuel economy and torque-generating performance of the drive system of the hybrid vehicle can be improved while preserving a sufficient amount of remaining charge in the storage battery 14.

Figure 13:
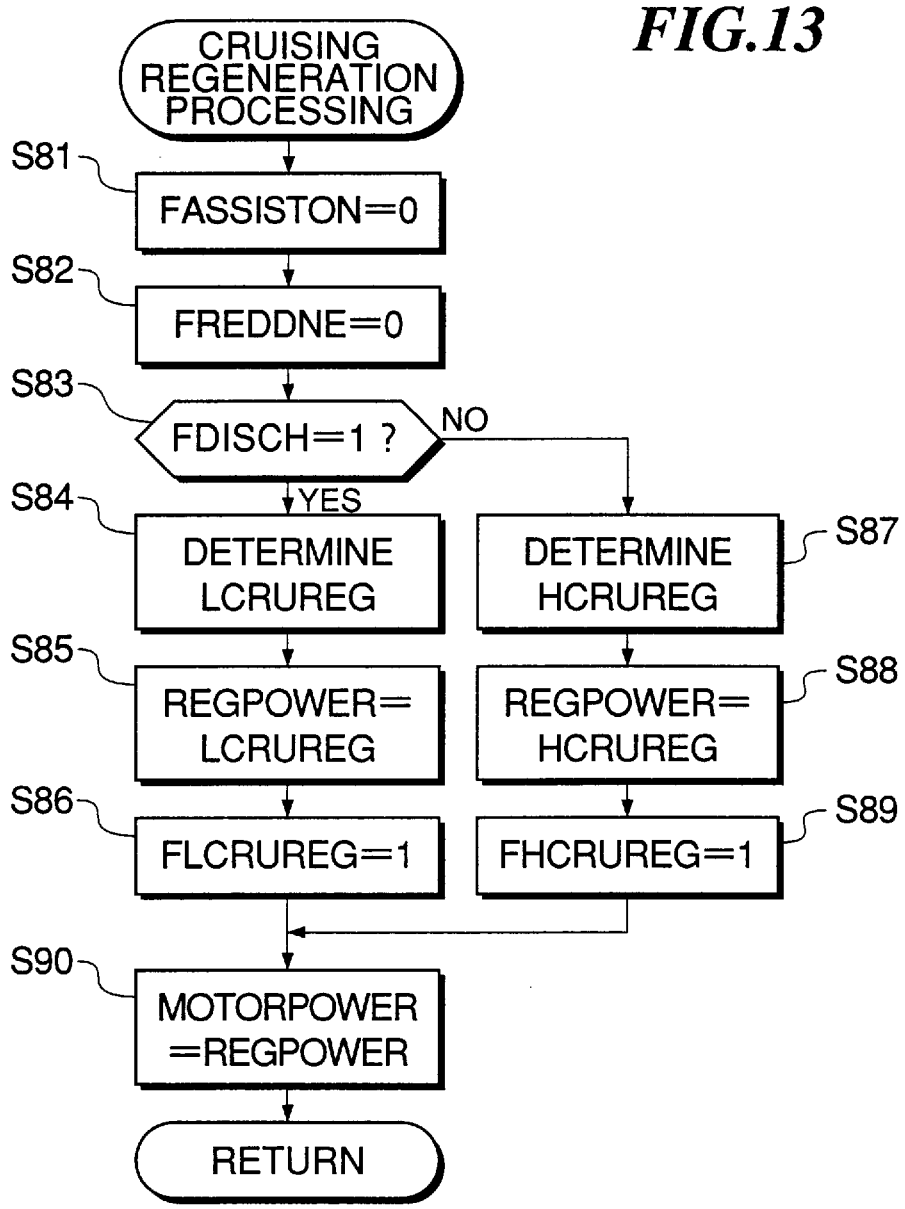
FIG. 13 is a flowchart showing a subroutine for cruising regeneration processing.

FIG. 13 shows details of the subroutine for the cruising regeneration processing executed at the step S67 in FIG. 12.

First, the assistance-executing flag FASSISTON is set to "0" at a step S81, and the fluctuation-reducing flag FREDDNE is set to "0" at a step S82. Then, it is determined at a step S83 whether or not the discharge-permitting flag FDISCH assumes "1" (see the steps S5 and S11 in FIG. 5). If FDISCH=1 holds, which means that the discharging of the storage battery 14 is permitted, a lower-rate cruising regeneration amount LCRUREG is determined at a step S84. More specifically, a LCRUREG map, which is set similarly to the FIG. 10 MOTORPOWER map such that a plurality of LCRUREG maps are provided for respective speed positions of the gear position GP, LCRUREG values of each LCRUREG map corresponding to predetermined values of the engine rotational speed NE and predetermined values of the extra output EXPOWER, is retrieved, to thereby determine the lower-rate cruising regeneration amount LCRUREG.

At the following step S85, a regeneration output REGPOWER is set to a value of the lower-rate cruising regeneration amount LCRUREG determined at the step S84, and then the lower-rate cruising regeneration flag FLCRUREG, which, when set to "1", indicates that the lower-rate cruising regeneration is being executed, is set to "1" at a step S86, and the motor demanded output MOTORPOWER is set to the regeneration output REGPOWER at a step S90, followed by terminating the program.

On the other hand, if FDISCH=0 holds at the step S83, which means that the amount of remaining charge in the storage battery 14 is small, a higher-rate cruising regeneration amount HCRUREG is determined at a step S87. More specifically, an HCRUREG map, which is set similarly to the FIG. 10 MOTORPOWER map such that a plurality of HCRUREG maps are provided for respective speed positions of the gear position GP, HCRUREG values of each HCRUREG map corresponding to predetermined values of the engine rotational speed NE and predetermined values of the extra output EXPOWER, is retrieved, to thereby determine the higher-rate cruising regeneration amount HCRUREG. In the HCRUREG map, each HCRUREG value is set to a larger amount of regeneration of electrical energy than a corresponding LCRURGEG value for identical values of the parameters (NE, EXPOWER, GP). Then, the regeneration output REGPOWER is set to the determined higher-rate cruising regeneration amount HCRUREG at a step S88, and the higher-rate cruising regeneration flag FHCRUREG, which, when set to "1", indicates that the higher-rate cruising regeneration is being executed, is set to "1" at a step S89, followed by the program proceeding to the step S90.

As described above, according to the FIG. 13 processing, when the discharging of the storage battery 14 is permitted, i.e. the amount of remaining charge in the storage battery 14 is equal to or larger than the predetermined value, the lower-rate cruising regeneration is executed, whereas, if the amount of remaining charge in the storage battery 14 is small and the discharging of the storage battery 14 is not permitted, the higher-rate cruising regeneration is executed to generate a larger amount of electricity. Therefore, it is possible to charge or recharge the storage battery 14 in a suitable fashion dependent on the amount of remaining charge in the storage battery 14.

Figure 14:
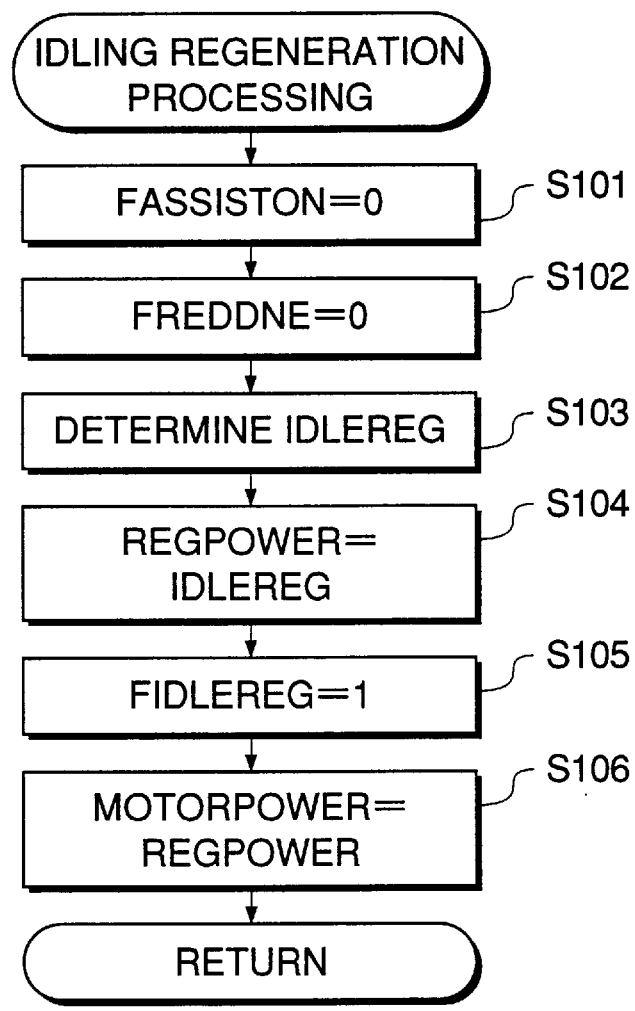
FIG. 14 is a flowchart showing a subroutine for idling regeneration processing.

FIG. 14 shows details of the subroutine for the idling regeneration processing which is executed at the step S69 in FIG. 12.

Figure 15:
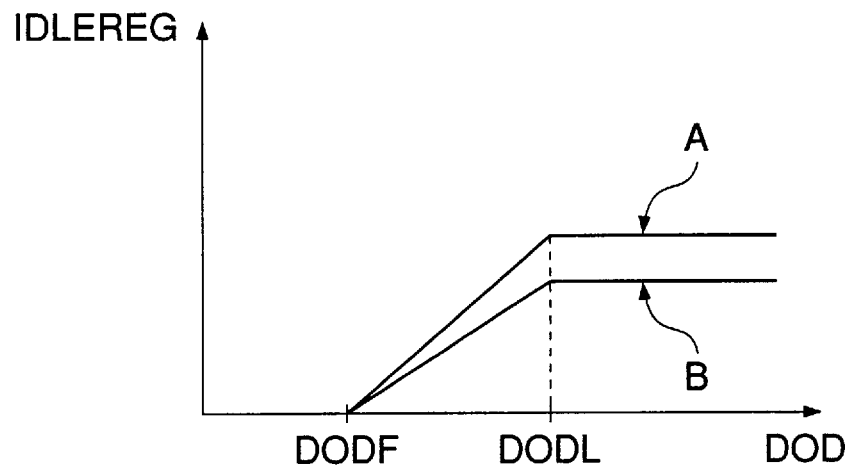
FIG. 15 shows an IDLEREG table for use in the FIG. 14 processing.

In this subroutine, first, the assistance-executing flag FASSISTON is set to "0" at a step S101, and the fluctuation-reducing flag FREDDNE is set to "0" at a step S102. Then, an IDLEREG table is retrieved according to the depth of discharge DOD to determine an idling regeneration amount IDLEREG at a step S103. The IDLEREG table is set, e.g. as shown in FIG. 15, such that in a range where the depth of discharge DOD is smaller than the predetermined reference value DODL, the idling regeneration amount IDLEREG increases as the depth of discharge DOD increases, whereas in a range of the depth of discharge DOD being larger than the predetermined reference value DODL, the same is set to a fixed value. Further, when the temperature TD of the drive circuit of the traction motor 3 is lower than a predetermined value, values indicated by a line A are used, while when the temperature TD of the drive circuit of the traction motor 3 is higher than the predetermined value, values indicated by a line B are used. This prevents an excessive rise in the temperature TD of the drive circuit of the traction motor 3 by setting the amount of regeneration of electrical energy to a small value when the TD value is high.

Then, the regeneration output REGPOWER is set to the determined idling regeneration amount IDLEREG at a step S104, and the idling regeneration flag FIDLEREG is set to "1" at a step S105. Then, the motor demanded output MOTORPOWER is set to the regeneration output REGPOWER at a step S106, followed by terminating the program.

FIG. 16 shows details of the subroutine for the decelerating regeneration processing which is executed at the step S65 in FIG. 12.

In this subroutine, first, the assistance-executing flag FASSISTON is set to "0" at a step S111, and the fluctuation-reducing flag FREDDNE is set to "0" at a step S112. Then, a decelerating regeneration amount DECREG is determined at a step S113. More specifically, the MOTORPOWER map shown in FIG. 10 is retrieved according to the engine rotational speed NE and the extra output EXPOWER (during deceleration of the engine, an area of EXPOWER<0 is retrieved). Then, a predetermined value is added to the MOTORPOWER value thus retrieved to obtain the decelerating regeneration amount DECREG. The addition of the predetermined amount is for making the decelerating regeneration amount DECREG suitable for a substantially fully-opened state of the throttle valve 103, which is set when the regeneration of electrical energy is executed during deceleration of the engine 1, as described hereinbelow (step S200 in FIG. 23).

Then, the regeneration output REGPOWER is set to the calculated decelerating regeneration amount DECREG at a step S114, and the decelerating regeneration flag FDREG, which, when set to "1", indicates that the decelerating regeneration is being executed, is set to "1" at a step S115. Then, the motor demanded output MOTORPOWER is set to the regeneration output REGPOWER at a step S116, followed by terminating the program.

Figure 17:
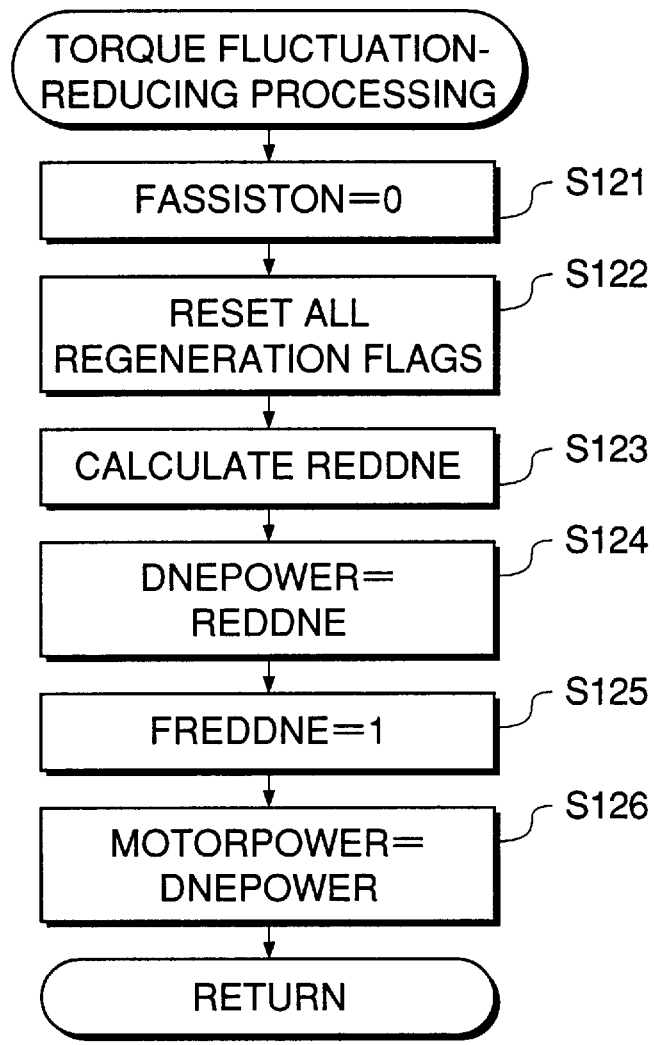
FIG. 17 is a flowchart showing a subroutine for torque fluctuation-reducing processing.

FIG. 17 shows details of the subroutine for the torque fluctuation-reducing processing executed at the step S70 in FIG. 12. When the rotational speed of the engine 1 largely fluctuates, this processing is carried out to thereby control or reduce fluctuations in the torque of the drive shaft 2 by means of the assistance of the traction motor 3 or the regeneration of electrical energy by the traction motor 3.

In this subroutine, first, the assistance-executing flag FASSISTON is set to "0" at a step S121, and all the regeneration flags (FLCRUREG, FHCRUREG, FIDLEREG, FDREG) are set to "0" at a step S122. Then, a torque fluctuation control amount REDDNE, i.e. an amount of motor output required for controlling or reducing fluctuations in the torque of the drive shaft 2 is calculated at a step S123 in the following manner:

First, an average inertial kinetic energy EA of the engine 1 and an instantaneous inertial kinetic energy EI of the same are calculated by the following equations (2) and (3):

$$EA = I \times NEA^2 / 2 \quad (2)$$

$$EI = I \times NE^2 / 2 \quad (3)$$

where I represents a virtual moment of inertia, NE an instantaneous value of the engine rotational speed, and NEA an average value of the engine rotational speed (obtained by detecting NE values at predetermined time intervals and averaging the same in a predetermined fashion).

Then, the torque fluctuation control amount REDDNE is calculated by the use of the following equation:

$$REDDNE = EA - EI \quad (4)$$

In stead of using the above equation (4), the torque fluctuation control amount REDDNE may be calculated by retrieving a map, which is set such that REDDNE values are provided in a manner corresponding to predetermined values of the average value NEA of the engine rotational speed and predetermined values of an amount of change $\Delta NE$ in the engine rotational speed (difference between the present value and the immediately preceding value of the engine rotational speed NE detected at predetermined time intervals), according to the NEA value and the $\Delta NE$ value.

Then, a fluctuation control output DNEPOWER is set to the torque fluctuation control amount REDDNE at a step S124, and the fluctuation-reducing flag FREDDNE is set to "1" at a step S125. Then, the motor demanded output MOTORPOWER is set to the fluctuation control output DNEPOWR at a step S126, followed by terminating the program.

As described above, the MOTECU 12 controls the PDU 13 based on the motor output OUTPUTPOWER determined by the motor output-determining processing shown in FIGS. 11 and 12, to thereby control the operating mode of the traction motor 3 (assisting mode, regenerative mode, and zero output mode).

Figure 18:
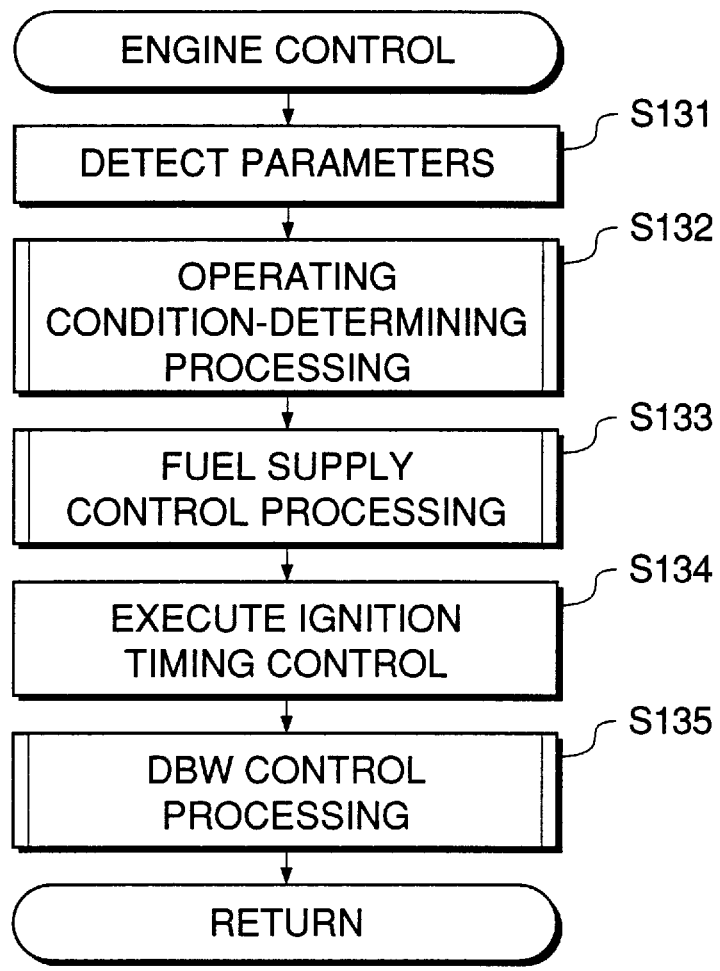
FIG. 18 is a flowchart showing a program for overall engine control.

Next, a manner of engine control executed by the ENGECU 11 will be described. FIG. 18 shows a program for overall engine control, which is executed e.g. at predetermined time intervals.

First, various engine operating parameters, such as the engine rotational speed NE and the intake pipe absolute pressure PBA, are detected at a step S131, and then, operating condition-determining processing (step S132), fuel supply control processing (step S133), ignition timing control processing (step S134), and DBW control (throttle valve opening control via the throttle actuator 105) processing (step S135) are sequentially executed.

Figure 19:
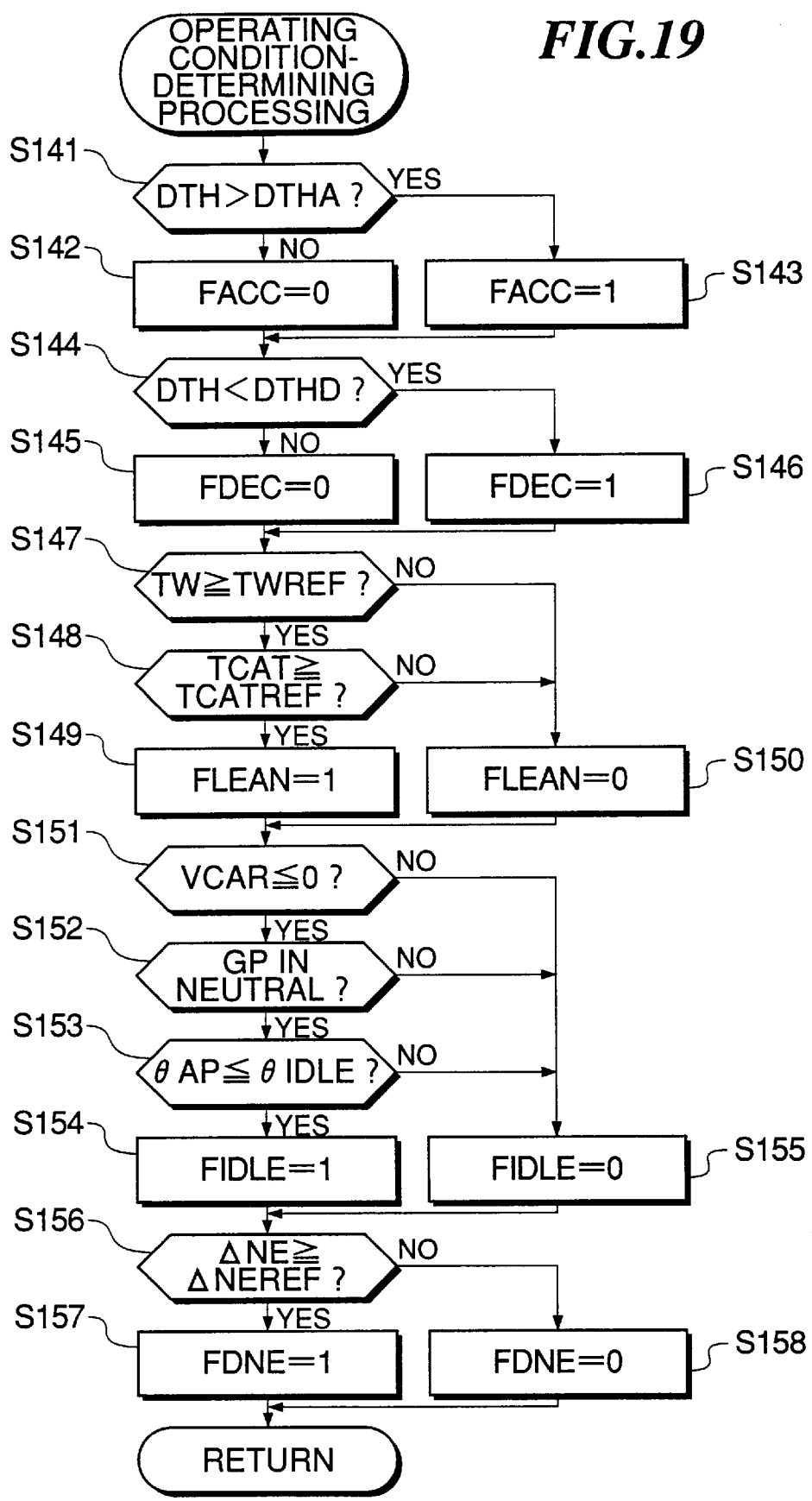
FIG. 19 is a flowchart showing a subroutine for engine operating condition-determining processing.

FIG. 19 shows a subroutine for the operating condition-determining processing executed at the step S132 in FIG. 18.

At a step S141, it is determined whether or not the amount of change DTH in the throttle valve opening $\theta$TH (DTH= present $\theta$TH value–immediately preceding $\theta$TH value) is larger than a predetermined positive value DTHA. If DTH>DTHA holds, an acceleration flag FACC is set to "1" at a step S143, whereas if DTH$\leq$DTHA holds, the acceleration flag is set to "0" at a step S142, and then the program proceeds to a step S144.

At the step S144, it is determined whether or not the amount of change DTH in the throttle valve opening $\theta$TH is smaller than a predetermined negative value DTHD. If DTH<DTHD holds, the deceleration flag FDEC is set to "1" at a step S146, whereas if DTH$\geq$DTHA holds, the deceleration flag is set to "0" at a step S145, and then the program proceeds to a step S147.

At the step S147, it is determined whether or not the engine coolant temperature TW is equal to or higher than higher than a predetermined value TWREF. If TW$\geq$TWREF holds, it is further determined at a step S148 whether or not the catalyst temperature TCAT is equal or higher than a predetermined reference value TCATREF. If TW<TWREF holds at the step S147, or if TCAT<TCATREF holds at the step S148, a leaning flag FLEAN is set to "0" at a step S150 to inhibit leaning operation of the engine 1, while if TW$\geq$TWREF holds at the step S147 and at the same time TCAT$\geq$TCATREF holds at the step S148, the leaning flag FLEAN is set to "1" at a step S149 to permit the leaning operation of the engine 1.

At the following step S151, it is determined whether or not the vehicle speed VCAR is equal to or lower than 0. If VCAR$\leq$0 holds, which means that the vehicle is in stoppage, it is determined at a step S152 whether or not the gear position GP is in the neutral position. If the gear position GP is in the neutral position, it is determined at a step S153 whether or not the accelerator opening $\theta$AP is equal to or smaller than a predetermined idling value $\theta$IDLE. If all the answers to the questions of the steps S151 to S153 are affirmative (YES), it is judged that the engine is idling, so that the idling flag FIDLE is set to "1" at a step S154, whereas if any of the answers to the questions of the steps S151 to S153 is negative (NO), it is judged that engine is not idling, so that the idling flag FIDLE is set to "0" at a step S155, and then the program proceeds to a step S156.

At the step S156, it is determined whether or not the amount of change $\Delta NE$ in the engine rotational speed NE ($\Delta NE$=present NE value–immediately preceding NE value) is equal or larger than a predetermined value $\Delta NEREF$. If $\Delta NE \geq \Delta NEREF$ holds, the rotation fluctuating flag FDNE is set to "1" at a step S157, whereas if $\Delta NE < \Delta NEREF$ holds, the rotation fluctuation flag is set to "0" at a step S158, followed by terminating the program.

Figure 20:
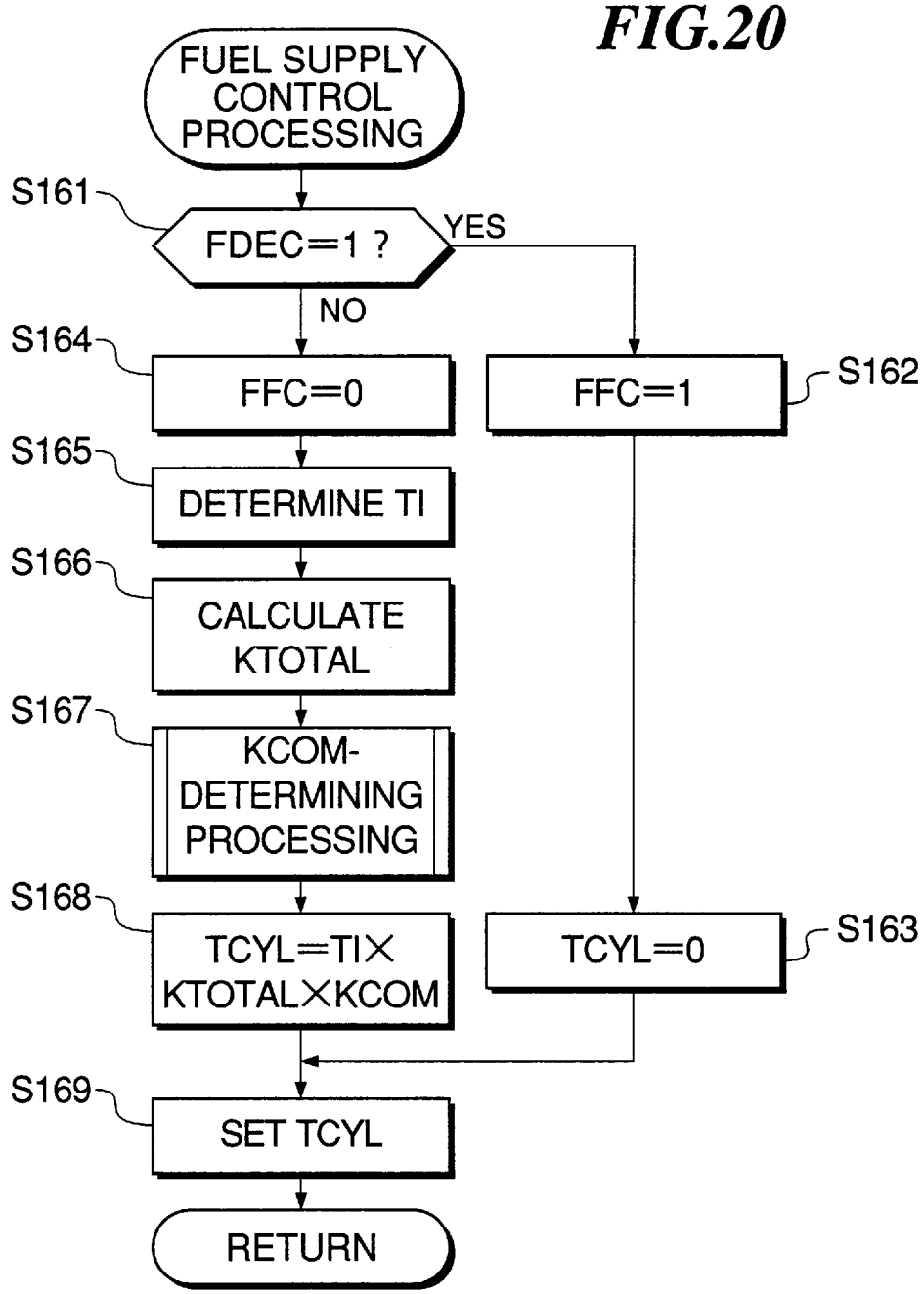
FIG. 20 is a flowchart showing a subroutine for fuel supply control processing.

FIG. 20 shows a subroutine for the fuel supply control processing executed at the step S133 in FIG. 18.

First, at a step S161, it is determined whether or not the deceleration flag FDEC assumes "1". If FDEC=1 holds, which means that the engine 1 is decelerating, a fuel-cut flag FFC, which, when set to "1", indicates that fuel cut is being carried out, is set to "1" at a step S162 and a fuel injection time period TCYL is set to "0" at a step S163, followed by the program proceeding to a step S169.

If FDEC=0 holds at the step S161, which means that the engine is not decelerating, the fuel-cut flag FFC is set to "0" at a step S164, and a basic fuel injection period TI is determined at a step S165 based on the engine rotational speed NE and the intake pipe absolute pressure PBA. Then, correction coefficients KTW, KTA, KLAF, etc. are determined respectively based on the engine coolant temperature TW, the intake air temperature TA, the air-fuel ratio detected by the LAF sensor 117, etc. The correction coefficients thus determined are multiplied by each other to obtain a total correction coefficient KTOTAL at a step S166.

Figure 21:
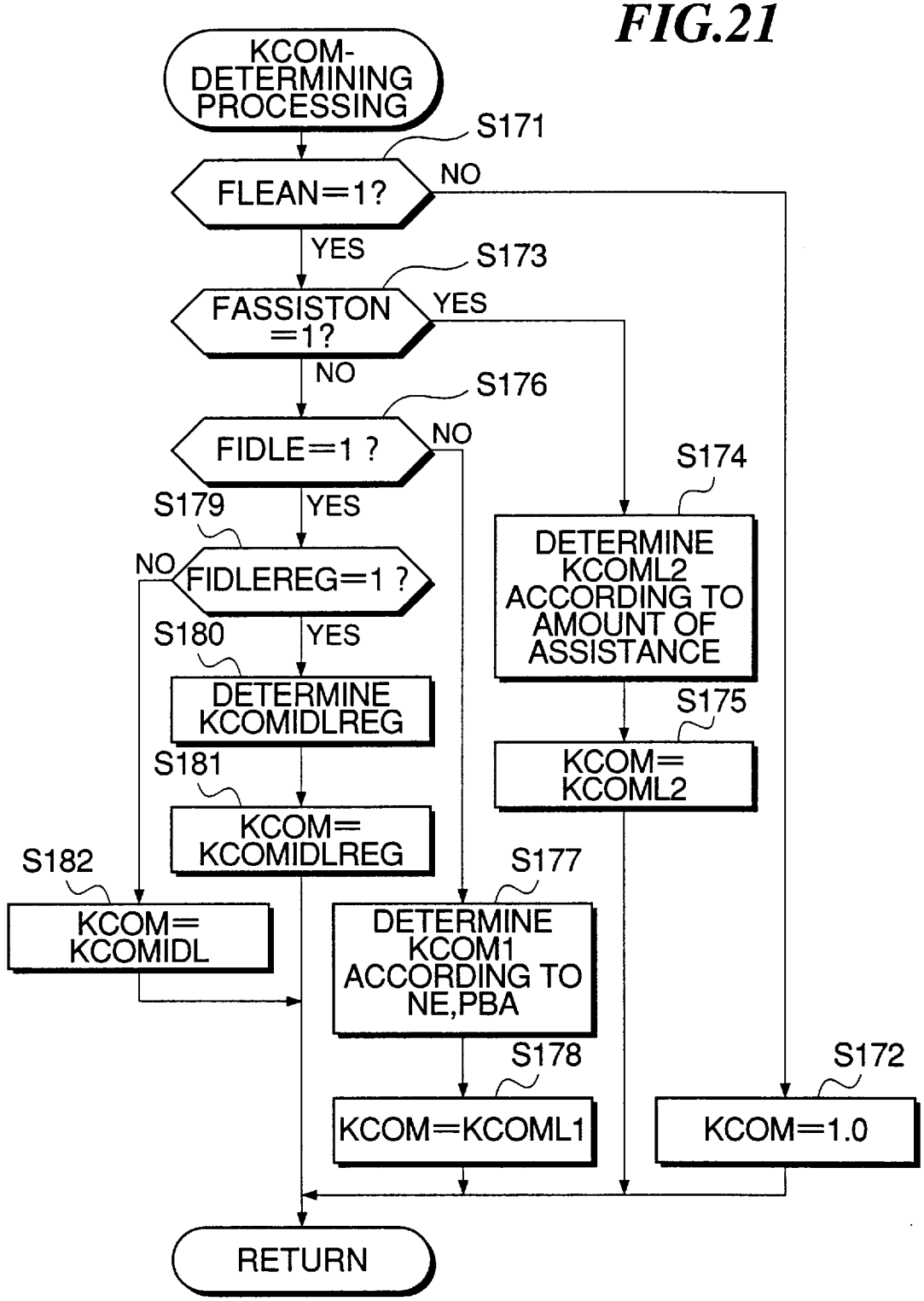
FIG. 21 is a flowchart showing a subroutine for desired air fuel ratio coefficient (KCOM)-determining processing.

At the following step S167, a desired air-fuel ratio coefficient KCOM is determined by executing a subroutine for KCOM-determining processing shown in FIG. 21. Then, the parameters determined at the steps S165 to S167 are applied to the following equation (5) to calculate the fuel injection period TCYL at a step S168, followed by the program proceeding to the step S169:

$$TCYL = TI \times KTOTAL \times KCOM \quad (5)$$

At the step S169, the TCYL value is set to an output register for fuel injection by the fuel injection valves 106 at proper timing.

FIG. 21 shows details of the subroutine for the KCOM-determining processing which is executed at the step S167 in FIG. 20. The desired air-fuel ratio coefficient KCOM is proportional to the reciprocal of the desired air-fuel ratio, with its value of "1.0" corresponding to the stoichiometric air-fuel ratio.

First, at a step S171, it is determined whether or not the leaning flag FLEAN assumes "1". If FLEAN=0 holds, which means that the leaning operation of the engine is not permitted, the desired air-fuel ratio coefficient KCOM is set to "1.0" at a step S172, followed by terminating the program.

Figure 22:
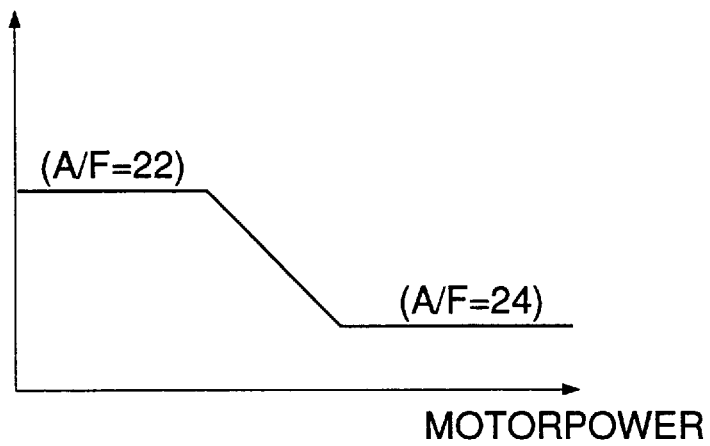
FIG. 22 shows a KCOML2 table for use in the FIG. 21 processing.

If FLEAN=1 holds at the step S171, it is determined at a step S173 whether or not the assistance-executing flag FASSISTON assumes "1". If FASSISTON=1 holds, a KCOML2 table is retrieved according to the amount of assistance of the traction motor 3, i.e. the motor output MOTORPOWER, to determine a leaning desired air-fuel ratio coefficient KCOML2 suitable for the assisting mode of the traction motor 3 (<1.0) at a step S174. The KCOML2 table is set, e.g. as shown in FIG. 22, such that as the amount of assistance (MOTORPOWER) increases, the air-fuel ratio of the mixture supplied to the engine 1 becomes leaner.

At the following step S175, the desired air-fuel ratio correction coefficient KCOM is set to the KCOML2 value determined at the step S174, followed by terminating the program.

If FASSISTON=0 holds at the step S173, which means that the assistance of the traction motor 3 is not being executed, it is determined at a step S176 whether or not the idling flag FIDLE assumes "1". If FIDLE=0 holds, which means that the engine is not idling, a leaning desired air-fuel ratio coefficient KCOML1 (<1.0) is determined at a step S177 according to the engine rotational speed NE and the intake pipe absolute pressure PBA, and the desired air-fuel ratio coefficient KCOM is set to the KCOML1 value at a step S178, followed by terminating the program.

If FILDE=1 holds at the step S176, which means that the engine is idling, it is determined at a step S179 whether or not the idling regeneration flag FIDLEREG assumes "1". If FIDLEREG=0 holds, which means that the regeneration of electrical energy by the traction motor 3 is not being executed, the desired air-fuel ratio coefficient KCOM is set to a predetermined idling desired air-fuel ratio coefficient KCOMIDL at a step S182, followed by terminating the program. If FIDLEREG=1 holds at the step S179, which means that the regeneration is being executed, a leaning desired air-fuel ratio coefficient KCOMIDLREG suitable for idling regeneration, i.e. the regenerative mode of the traction motor 3 during idling of the engine 1 (e.g. corresponding to A/F=approximately 22.0) is determined at a step S180, and the desired air-fuel ratio coefficient KCOM is set to the KCOMIDLREG value, followed by terminating the program. It should be noted that the KCOMIDLREG value may be set as a function of the amount of regeneration of electrical energy by the traction motor 3.

By thus setting the air-fuel ratio of the mixture supplied to the engine to a leaner value than the stoichiometric value during the idling regeneration, it is possible to improve the ratio of specific heats and reduce the heat loss, thereby improving the fuel economy of the engine 1.

Figure 27A:
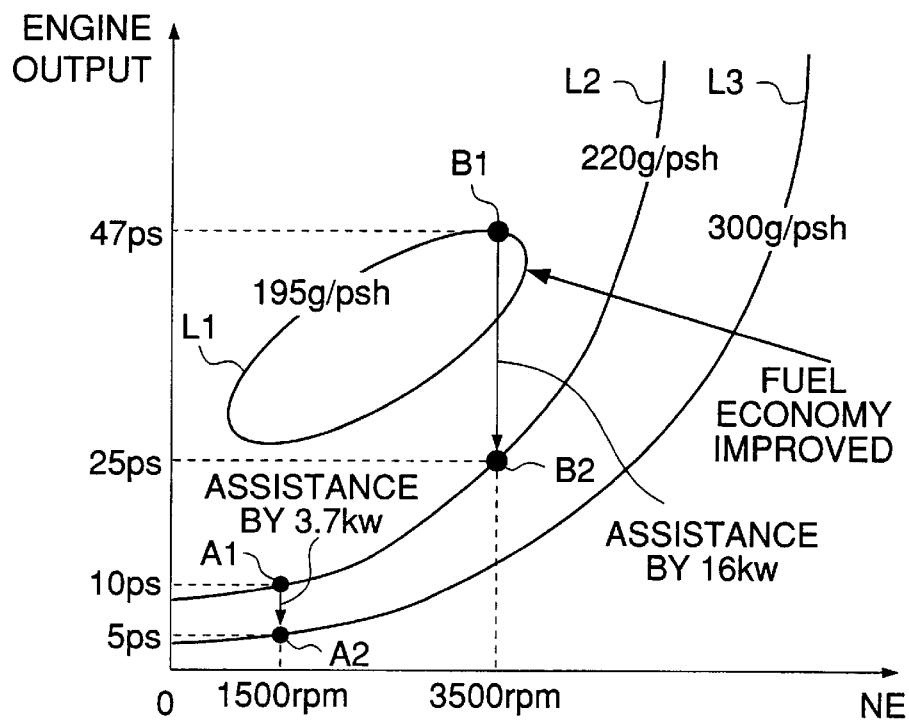
FIG. 27A is a graph which is useful in explaining brake specific fuel consumption (BSFC) characteristics exhibited when the engine is operated with the air-fuel ratio of a mixture supplied to the engine set to a stoichiometric value.
Figure 27B:
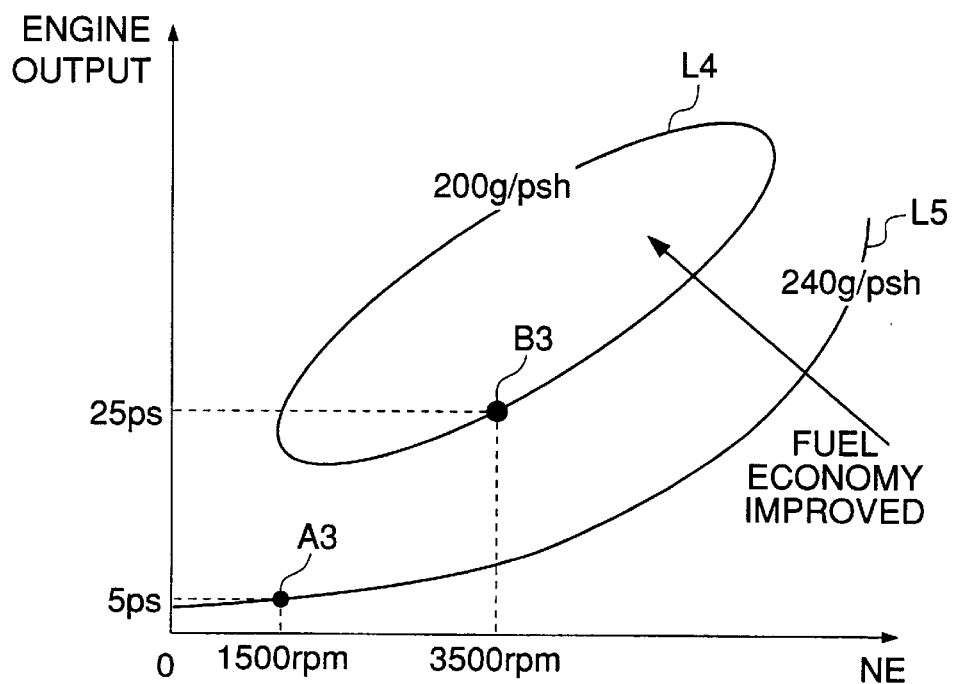
FIG. 27B is a graph which is useful in explaining brake specific fuel consumption (BSFC) characteristics exhibited when the engine is operated with the air-fuel ratio set to a leaner value than the stoichiometric value.

FIGS. 27A and 27B are diagrams which are useful in explaining effects of leaning the air-fuel ratio of the mixture during execution of the assistance of the traction motor 3 to the engine 1 at the steps S173 to 175. Each figure shows brake specific fuel consumption (BSFC) characteristics. FIG. 27A shows a case in which the engine is operated with the air-fuel ratio of the mixture set to a stoichiometric value, while FIG. 27B shows a case in which the engine is operated with the air-fuel ratio set to a leaner value than the stoichiometric value.

In each of the figures, the abscissa represents the engine rotational speed NE and the ordinate engine output (ps; metric horsepower). L1 to L5 each designate a curve along which the fuel consumption rate is constant. For example, on a curve L2, the fuel consumption rate is equal to 220 g/psh. g/psh represents a unit of the fuel consumption rate, i.e. an amount of fuel consumption (grams) per ps and hour. As is clear from the figures, as the engine rotational speed NE and the engine output come nearer to the center of each characteristics diagram, the fuel economy is improved.

When the assistance of the traction motor 3 is not provided and the engine operating condition corresponds to a point A1 (NE=1500 rpm and engine output=10 ps) on the curve L2, the fuel consumption per hour is 220 g/psh×10 ps=2200 g/h. If the assistance of the traction motor 3 by 3.7 kilowatts is provided, the engine demanded output becomes equal to 5 ps, so that the operating point of the engine 1 in the figure moves to a point A2 on the curve L3. In this state, the fuel consumption per hour is 300 g/psh×5 ps=1500 g/h, which means that the fuel consumption is reduced by 700 g/h compared with the case of no assistance of the traction motor 3 being provided. However, the efficiency of the engine (fuel consumption rate) is degraded from 220 g/psh to 300 g/psh.

Further, when the engine operating condition without the assistance of the traction motor 3 corresponds to a point B1 (NE=3500 rpm and engine output=47 ps), the fuel consumption per hour is 195 g/psh×47 ps=9165 g/h. If the assistance of the traction motor 3 by 16 kilowatts is provided, the operating point of the engine 1 in the figure moves to a point B2 on the curve L2, which means that the fuel consumption per hour is 220 g/psh×25 ps=5500 g/h. Therefore, the fuel consumption per hour is reduced by 3665 g/h, but the efficiency of the engine (fuel consumption rate) is degraded from 195 g/psh to 220 g/psh.

In view of the inconvenience of the degraded efficiency of the engine as noted above, according to the present embodiment, the air-fuel ratio is leaned when the assistance of the traction motor 3 to the engine is provided, so that the operating point A2 on the curve L3 in FIG. 27A moves to a point A3 on a curve L5 in FIG. 27B, whereas the operating point B2 on the curve L2 in FIG. 27A moves to a point B3 on a curve L4 in FIG. 27B. At the operating point A3 in FIG. 29B, the fuel consumption per hour is 240 g/psh×5 ps=1200 g/h, which means that the fuel economy is further improved by 300 g/h even compared with the operating point A2 in FIG. 27A. The efficiency of the engine (fuel consumption rate) is improved from 300 g/psh to 240 g/psh. Further, at the operating point B3 in FIG. 27B, the fuel consumption per hour is 200 g/psh×25 ps =5000 g/h, which means that the fuel economy is further improved by 500 g/h. The efficiency of the engine (fuel consumption rate) is improved from 220 g/psh to 200 g/psh. This is because the leaning of the air-fuel ratio contributes to improvement in the ratio of specific heats, reduction of cooling loss, etc.

Further, according to the present embodiment, the desired air-fuel ratio coefficient KCOML2 during the leaning operation of the engine is set according to the amount of assistance of the traction motor 3. This enables the leaning desired air-fuel ratio to be set in a manner exerting control over surging of the rotational speed of the engine 1 by the assistance of the traction motor 1, whereby it is possible to make higher the lean limit of the air-fuel ratio (i.e. the engine 1 can be operated on a still leaner side).

Figure 23:
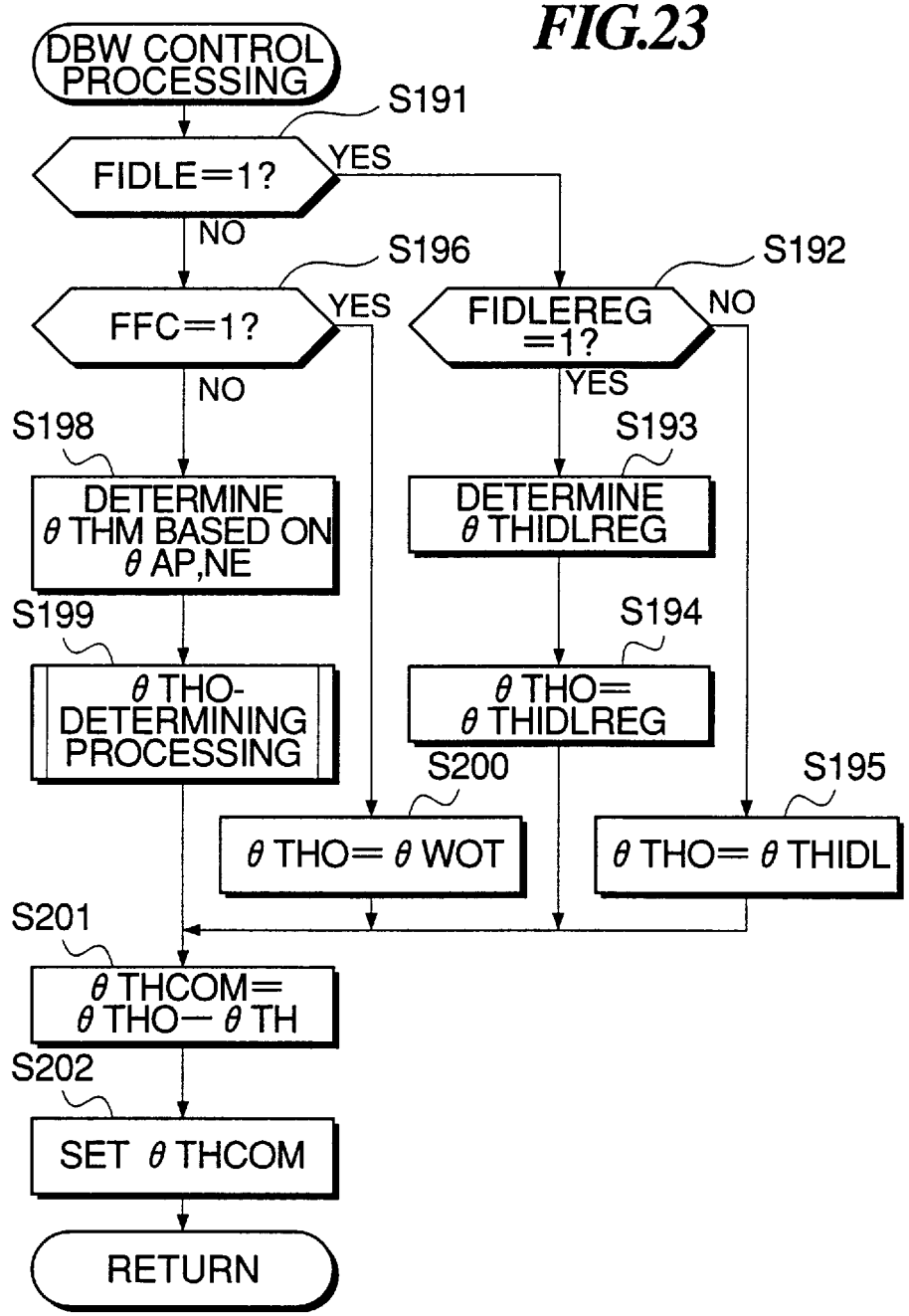
FIG. 23 is a flowchart showing a subroutine for throttle valve opening (DBW) control processing.

FIG. 23 shows a subroutine for the DBW control processing, i.e. processing for controlling the throttle valve opening, which is executed at the step S135 in FIG. 8.

First, at a step S191, it is determined whether or not the idling flag FIDLE assumes "1". If FIDLE=1 holds, which means that the engine is idling, it is determined at a step S192 whether or not the idling regeneration flag FIDLEREG assumes "1". If FIDLEREG=0 holds, which means that the regeneration of electrical energy is not being executed, a desired throttle valve opening θTHO is set to a predetermined value θTHIDL for ordinary idling operation of the engine at a step S195, followed by the program proceeding to a step S201.

Figure 24:
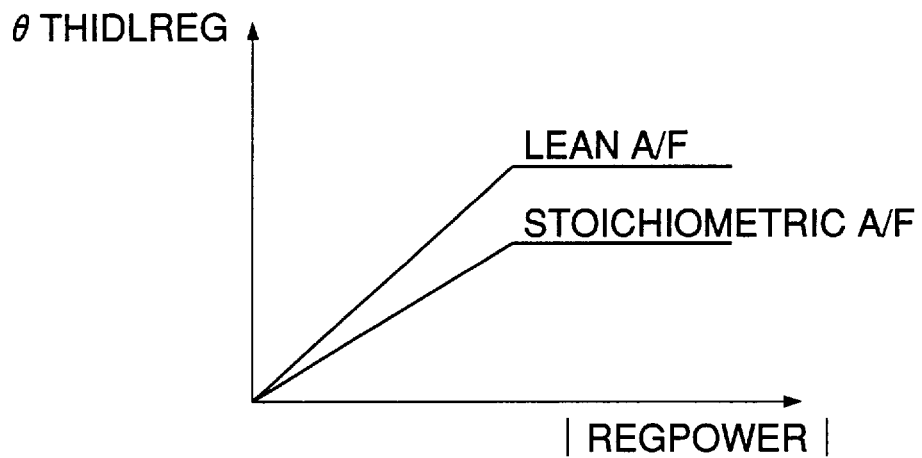
FIG. 24 shows a θTHIDLREG table for use in the FIG. 23 processing.

If FIDLEREG=1 holds at the step S192, a desired throttle opening θTHIDLREG for the idling regeneration is determined. More specifically, the desired opening θTHIDLREG is determined by retrieving a θTHIDLREG table, which is set e.g. as shown in FIG. 24, such that as the absolute value |REGPOWER| of the amount of regeneration REGPOWER increases, the θ THIDLREG value increases, according to the amount of regeneration REGPOWER. Further, when the desired air-fuel ratio is set to the stoichiometric air-fuel ratio, values suitable for controlling the air-fuel ratio to the stoichiometric air-fuel ratio are used, while the desired air-fuel ratio is set to a value leaner than the stoichiometric air-fuel ratio, values suitable for controlling the air-fuel ratio to the leaner air-fuel ratio are used. Then, the desired throttle valve opening θTHO is set to the θTHIDLREG value at a step S194, followed by the program proceeding to the step S201.

Thus, when the idling regeneration is being executed, the intake air amount is increased to thereby permit kinetic energy to be generated in an amount required for regeneration of electrical energy by the traction motor 3.

Figure 28:
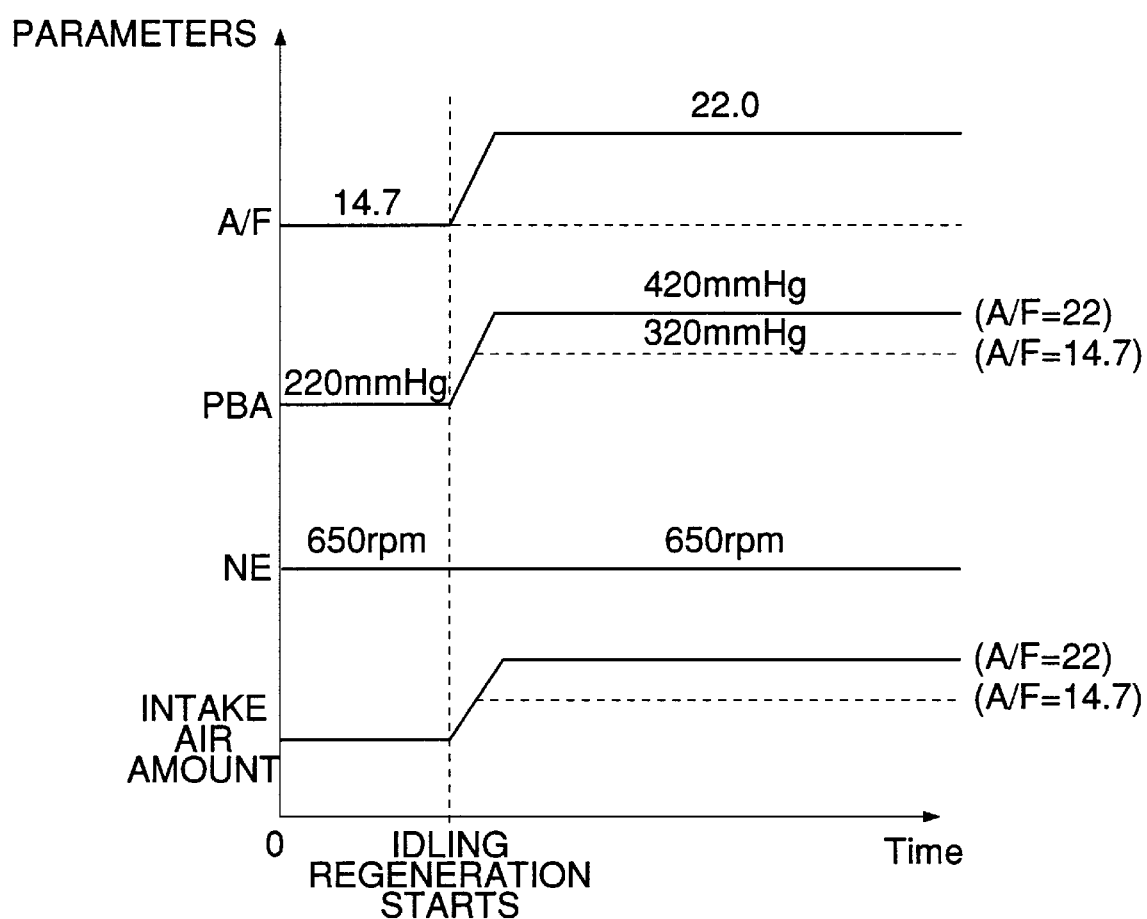
FIG. 28 is a graph showing changes in parameters indicative of operating conditions of the engine exhibited when idling regeneration is started.

FIG. 28 shows changes in engine operating parameters before and after the idling regeneration is started. By executing the above steps S192 to S194, the intake air amount and the intake pipe absolute pressure PBA are increased, and by executing the steps S179 to S181 in FIG. 21, the air-fuel ratio is changed e.g. to a value of A/F=approximately 22.0. This makes it possible to improve the ratio of specific heats and reduce the heat loss, thereby improving the fuel economy of the engine.

On the other hand, if FIDLE=0 holds at the step S191, which means that the engine is not idling, it is determined at a step S196 whether or not the fuel-cut flag FFC assumes "1". If FFC=1 holds, which means that the fuel cut is being executed, the desired throttle valve opening θTHO is set to a wide-open throttle value θTHWOT which is assumed when the throttle valve is substantially fully opened, at the step S200. This prevents intake air from undergoing resistance due to a fully-closed state of the throttle valve 103 to cause an increased pumping loss, and hence promotes the regeneration of electrical energy by the traction motor 3, thereby efficiently converting the vehicle's kinetic energy to electrical energy.

Figure 25:
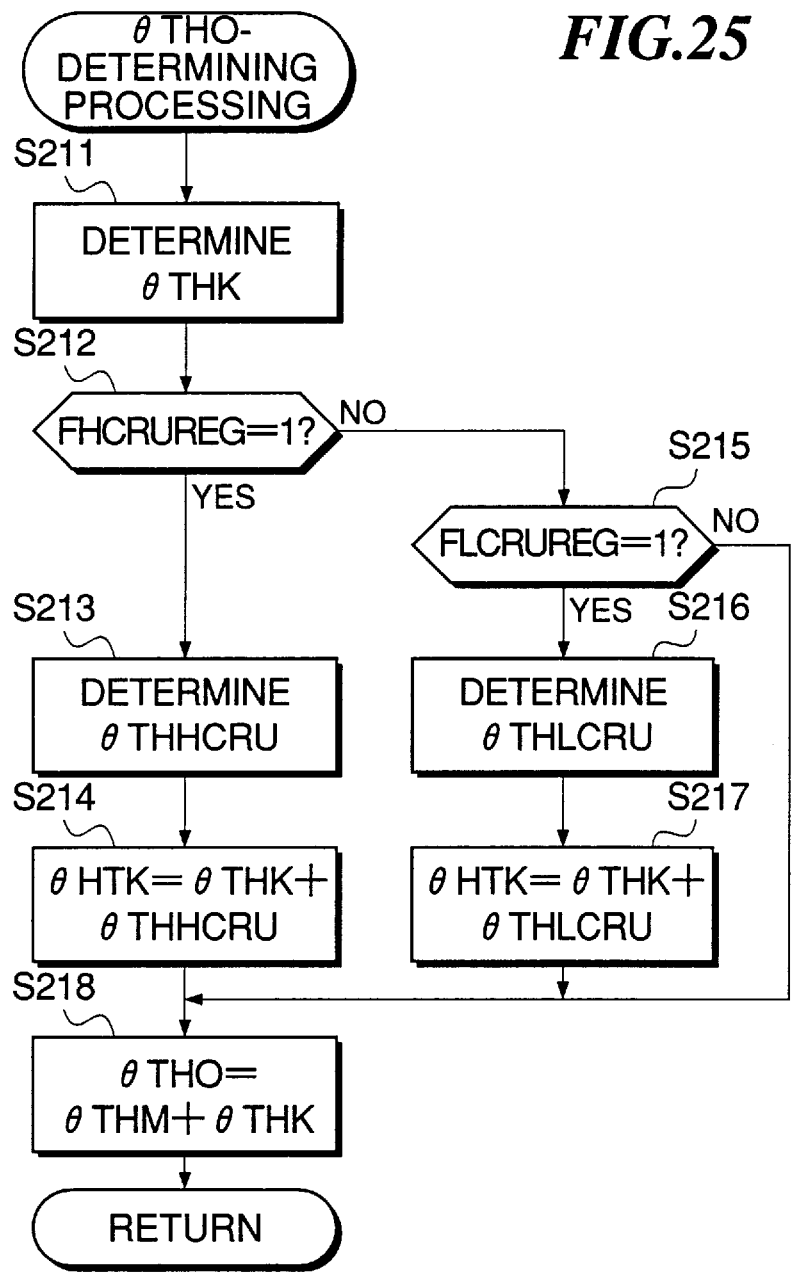
FIG. 25 is a flowchart showing a subroutine for desired throttle valve opening (θTHO)-determining processing.

If FFC=0 holds at the step S196, which means that the fuel cut is not being executed, a basic throttle valve opening θTHM is determined according to the accelerator opening θAP and the engine rotational speed NE at a step S198, and a subroutine for θTHO-calculating processing shown in FIG. 25 is executed at a step S199, followed by the program proceeding to the step S201.

At the step S201, the desired throttle valve opening θTHO and the detected throttle valve opening θ TH are applied to the following equation (6) to thereby calculate an actuator command value θTHCOM:

$$\theta THCOM = \theta THO - \theta TH \quad (6)$$

The throttle valve opening θTH in this equation may be replaced by a cumulative command value θTHP which is a cumulative value of command values θTHCOM supplied to the throttle actuator 105 (θTHP=immediately preceding θTHP value+immediately preceding θTHCOM value).

The calculated command value θTHCOM is set to the output register at a step S202, followed by terminating the program.

FIG. 25 shows details of the subroutine for the θTHO-calculating processing executed at the step S199 in FIG. 23.

Figure 26:
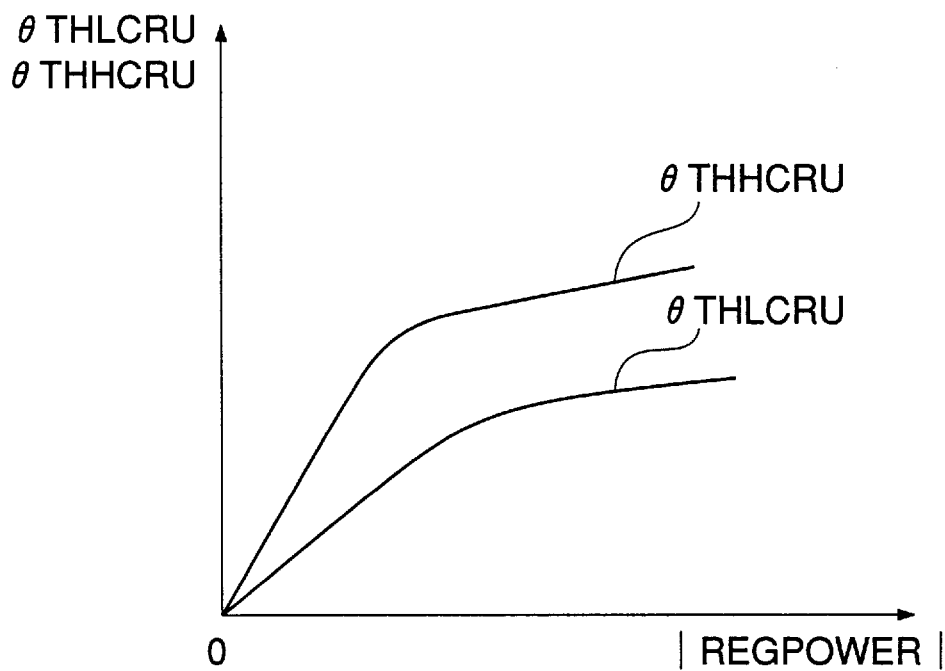
FIG. 26 shows a θTHLCRU/θTHHCRU table for use in the FIG. 25 processing.

First, at a step S211, correction terms for correcting the throttle valve opening θTH depending on respective engine operating parameters are added together to thereby calculate a total correction term θTHK. Then, it is determined at a step S212 whether or not the higher-rate cruising regeneration flag FHCRUREG assumes "1". If FHCRUREG=1 holds, which means that the higher-rate cruising regeneration is being executed, a higher-rate cruising regeneration-dependent correction term θTHHCRU is determined. More specifically, the higher-rate cruising regeneration-dependent correction term θTHHCRU is determined by retrieving a θTHHCRU table which is set, e.g. as shown in FIG. 26, such that as the absolute value |REGPOWER| of the amount of regeneration REGPOWER increases, the θ THHCRU value increases, according to the amount of regeneration REGPOWER.

At the following step S214, the total correction term θTHK is corrected by adding the higher-rate cruising regeneration-dependent correction term θTHHCRU to the total correction term θTHK determined at the step S211, and then the program proceeds to a step S218.

If FHCRUREG=0 holds at the step S212, it is determined at a step S215 whether or not the lower-rate cruising regeneration flag FLCRUREG assumes "1". Then, if FLCRUREG=0 holds, which means that the lower-rate cruising regeneration is not being executed, the program jumps to the step S218, whereas if FLCRUREG=1 holds, which means that the lower-rate cruising regeneration is being executed, a lower-rate cruising regeneration-dependent correction term θTHLCRU is determined by retrieving a θTHLCRU table shown in FIG. 26 in a fashion combined with the θTHLCRU table. The lower-rate cruising regeneration-dependent correction term θTHLCRU is set such that as the absolute value |REGPOWER| of the amount of regeneration REGPOWER increases, the θTHLCRU value increases, with each θ THLCRU value being smaller than a corresponding θTHHCRU value for an identical value of the absolute value |REGPOWER|.

At the following step S217, the lower-rate cruising regeneration term θTHLCRU is added to the total correction term θTHK calculated at the step S211 to correct the total correction term θTHK, and then the program proceeds to the step S218.

At the step S218, the basic throttle valve opening θTHM and the total correction term θTHK are applied to the following equation (7), to thereby calculate the desired throttle valve opening θTHO, followed by terminating the program:

$$\theta THO = \theta THM + \theta THK \tag{7}$$

The invention is not limited to the embodiment described above, but it may be implemented by various modifications and variations thereof. For example, as electrical energy-storing means, a capacitor having a large electrostatic capacity may be used in combination with or in place of the storage battery 14.

Further, the invention may be applied to an engine which uses, in place of the throttle valve 103 of a so-called DBW type, a throttle valve of an ordinary type which is mechanically linked to the accelerator pedal. In such a case, the intake air amount may be controlled in a manner dependent on the amount of regeneration of electrical energy through control of a control valve arranged in a bypass passage bypassing the throttle valve. In the case of a type of engine equipped with solenoid-driven intake valves (driven not by a cam mechanism but by a solenoid), the intake air amount may be controlled by changing the valve opening period of intake valves. Further, when FFC=1 holds, i.e. when the supply of fuel to the engine is interrupted, it is preferred that the control valve in the bypass passage or the solenoid-driven intake valves are controlled to increase the intake air amount to the maximum (processing corresponding to the step S200 in FIG. 23).

Still further, although in the present embodiment, if FCH=0 holds, i.e. if recharging of the storage battery is not permitted, or if the temperature TD of the protective resistance of the PDU 13 is higher than the predetermined value TDF, the regeneration of electrical energy is inhibited (amount of regeneration=0) (steps S61, S52, S63 and S71 in FIG. 12), this is not limitative, but the amount of regeneration may be set to a very small value.

Even further, the transmission 4 may be replaced by a variable speed transmission which is capable of infinitely changing the gear reduction ratio. In such a case, the gear reduction ratio is determined not by detecting the gear position GP, but by detecting a ratio of the rotational speed of a trailing shaft to that of a drive shaft of the variable speed transmission. Then, it is preferred that the MOTORPOWER map shown in FIG. 10, and a LCRUREG map and a HCRUREG map, neither of which is shown, may be provided for each of predetermined ranges of the gear reduction ratio, or values obtained from these maps may be multiplied by a coefficient dependent on the gear reduction ratio.

What is claimed is:

1. A control system for a hybrid vehicle including an internal combustion engine, a drive shaft driven by said engine, a generator for converting kinetic energy of said drive shaft to electrical energy to generate electric power, and electrical storage means for storing electrical energy output from said generator, the control system comprising:

deceleration-detecting means for detecting deceleration of said engine;

fuel supply-interrupting means for interrupting supply of fuel to said engine during said deceleration of said engine;

intake air amount control means for controlling an amount of intake air supplied to said engine such that said amount of intake air supplied to said engine is increased when said generator regenerates electrical energy during said deceleration of said engine;

regeneration amount-calculating means for calculating an amount of electrical energy to be regenerated by said generator during said deceleration of said engine; and output control means for controlling an output from said generator, based on said amount of electrical energy calculated by said regeneration amount-calculating means.

2. A control system according to claim 1, including remaining charge-detecting means for detecting an amount of remaining charge in said electrical storage means, and wherein said regeneration amount-calculating means limits said amount of electrical energy to be regenerated, depending on said amount of remaining charge in said storage battery means detected by said remaining charge-detecting means.

3. A control system according to claim 1, including temperature-detecting means for detecting a temperature of said output control means, and wherein said regeneration amount-calculating means limits said amount of electrical energy to be regenerated, depending on said temperature of said output control means detected by said temperature-detecting means.

4. A control system according to claim 2, wherein when said amount of remaining charge in said battery storage means is substantially equal to an amount of charge to be stored in said electrical storage means when said electrical storage means is fully charged, said regeneration amount-calculating means sets said amount of electrical energy to be regenerated by said generator to zero.

5. A control system according to claim 1, wherein said engine includes an intake passage, and a throttle valve arranged in said intake passage, said intake air amount control means causing said throttle valve to be fully opened when said generator regenerates said electrical energy during said deceleration of said engine.

6. A control system according to claim 5, wherein said hybrid vehicle has a transmission connected to said engine, said control system including engine rotational speed-detecting means for detecting rotational speed of said engine, means for detecting a parameter representative of a gear reduction ratio of said transmission, and extra output-calculating means for calculating an extra output from said engine in excess of running resistance of said hybrid vehicle, said regeneration amount-calculating means calculating said amount of electrical energy to be regenerated by said generator during said deceleration of said engine by adding a predetermined amount corresponding to a fully-opened state of said throttle valve to an amount of electrical energy to be regenerated by said generator, which is determined based on said rotational speed of said engine, said gear reduction ratio of said transmission, and said extra output from said engine.

7. A control system according to claim 6, including vehicle speed-detecting means for detecting traveling speed of said hybrid vehicle, and wherein said running resistance of said hybrid vehicle is determined based on said vehicle speed detected by said vehicle speed detecting means, said extra output-calculating means calculating said extra output from said engine by subtracting said running resistance of said vehicle from an engine demanded output dependent on said rotational speed of said engine and load on said engine.

8. A control system according to claim 7, including throttle valve opening-detecting means for detecting opening of said throttle valve, and wherein said load on said engine is determined from said opening of said throttle valve opening.

9. A control system according to claim 8, wherein said hybrid vehicle includes an accelerator pedal, said control system including accelerator pedal opening-detecting means for detecting opening of said accelerator pedal corresponding to an accelerator pedal travel exerted by a driver, said load on said engine being determined from said opening of said accelerator pedal.

10. A control system according to claim 1, wherein said generator also serves as a motor operable on electrical energy from said electrical storage means, for assisting said engine.

* * * * *